United States Patent
Kimura et al.

(10) Patent No.: US 7,981,503 B2
(45) Date of Patent: Jul. 19, 2011

(54) STRETCHED RESIN FILM AND LABEL COMPRISING THE SAME

(75) Inventors: Kazuyuki Kimura, Ibaraki (JP); Masaaki Yamanaka, Ibaraki (JP); Hiroshi Koike, Ibaraki (JP); Seiichiro Iida, Ibaraki (JP); Takatoshi Nishizawa, Ibaraki (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 11/041,417

(22) Filed: Jan. 25, 2005

(65) Prior Publication Data

US 2005/0186371 A1 Aug. 25, 2005

Related U.S. Application Data

(63) Continuation of application No. PCT/JP03/09435, filed on Jul. 25, 2003.

(30) Foreign Application Priority Data

| Jul. 25, 2002 | (JP) | 2002-217029 |
| Sep. 4, 2002 | (JP) | 2002-259060 |
| Feb. 3, 2003 | (JP) | 2003-025575 |
| May 20, 2003 | (JP) | 2003-141577 |

(51) Int. Cl.
*B32B 1/02* (2006.01)
*B32B 5/18* (2006.01)
*B32B 27/08* (2006.01)
*B32B 27/32* (2006.01)

(52) U.S. Cl. .......... 428/317.7; 428/35.7; 428/317.3; 428/317.9; 428/323; 428/195.1; 428/200; 428/500

(58) Field of Classification Search .............. None
See application file for complete search history.

(56) References Cited

U.S. PATENT DOCUMENTS

| 6,811,837 B2 * | 11/2004 | Iwasa et al. ............... 428/32.17 |
| 2002/0028320 A1 | 3/2002 | Iwasa et al. |
| 2003/0017321 A1 | 1/2003 | Iwasa et al. |
| 2003/0071884 A1 * | 4/2003 | Iwasa et al. ............... 347/105 |

FOREIGN PATENT DOCUMENTS

| EP | 0 855 420 A2 | 7/1998 |
| EP | 1 264 705 A1 | 12/2002 |
| EP | 1279697 A1 | 1/2003 |
| JP | 2-84319 | 3/1990 |
| JP | 2-108516 | 4/1990 |
| JP | 2-122914 | 5/1990 |
| JP | 5-124335 | 5/1993 |
| JP | 5-169804 | 7/1993 |
| JP | 5-169806 | 7/1993 |
| JP | 5-249895 | 9/1993 |
| JP | 10-188188 | 7/1998 |
| JP | 10-212367 | 8/1998 |
| JP | 2001-106985 | 4/2001 |
| JP | 2001-139710 A | 5/2001 |
| JP | 2001-151918 | 6/2001 |
| JP | 2001-164017 | 6/2001 |
| JP | 2001-181423 | 7/2001 |
| JP | 2001181423 A * | 7/2001 |
| JP | 2001-226507 | 8/2001 |
| JP | 2001-246830 | 9/2001 |
| JP | 2001-253166 | 9/2001 |
| JP | 2001-301001 | 10/2001 |
| JP | 2002-46346 | 2/2002 |
| JP | 2002-46350 | 2/2002 |
| JP | 2002-46351 | 2/2002 |
| JP | 2002-96422 | 4/2002 |
| JP | 2002-328607 | 11/2002 |
| KR | 1998-70735 | 10/1998 |
| WO | WO 01/40361 A1 | 6/2001 |
| WO | WO 01/42340 A1 | 6/2001 |
| WO | WO 01/42341 A1 | 6/2001 |
| WO | WO 01/50443 A1 | 7/2001 |
| WO | WO 02/24448 A1 | 3/2002 |

* cited by examiner

Primary Examiner — Monique R Jackson
(74) Attorney, Agent, or Firm — Oblon, Spivak, McClelland, Maier & Neustadt, L.L.P.

(57) ABSTRACT

Disclosed is a stretched resin film having a liquid absorption coefficient of at least 5 ml/(m$^2$·ms$^{1/2}$). The stretched resin film has good liquid absorbability with good seepage resistance. When stuck to objects with a water-base adhesive, it dries within a short period of time and attains good adhesiveness.

36 Claims, 1 Drawing Sheet

STRETCHED RESIN FILM AND LABEL COMPRISING THE SAME

The present application is a continuation of PCT/JP03/09435 filed on Jul. 25, 2003 and claims priority under 35 U.S.C. §119 of Japanese Patent Application No. 217029/2002 filed on Jul. 25, 2002, Japanese Patent Application No. 259060/2002 filed on Sep. 4, 2002, Japanese Patent Application No. 25575/2003 filed on Feb. 3, 2003 and Japanese Patent Application No. 141577/2003 filed on May 20, 2003.

BACKGROUND OF THE INVENTION

1. Field of the Invention

The present invention relates to a stretched resin film having good liquid absorbability with good seepage resistance, which, when stuck to objects with a water-base adhesive, dries within a short period of time and attains good adhesiveness. The invention also relates to a stretched resin film which is fabricated by coating the stretched resin film as above with a water-base coating layer usable in inkjet recording paper, thermal recording paper, thermal transfer recording paper, pressure-sensitive transfer recording paper and other various types of printing paper. The invention further relates to a stretched resin film which is fabricated by coating the stretched resin film as above with a water-base heat-seal resin coating layer usable in in-mold labels or various heat-sealable bags, and to products produced by the use of it. The invention still further relates to a label that is readily delabelable by washing with water, not requiring washing with a heated sodium hydroxide solution in a process of removing it from returnables, and to an object with the label stuck thereto.

2. Description of the Related Art

1. Heretofore, water-resistant film-type synthetic paper is used principally for adhesive labels with an organic solvent-containing adhesive applied thereto, and for mediums for offset printing, seal printing or sublimation or fusion-type thermal transfer recording that uses a solvent-type ink. These days, however, environmental protection is a matter of great concern in the art, and it is recommended to use ecological and safe water-base adhesives and water-base inks in place of organic solvent-containing adhesives and solvent-type inks. Accordingly, synthetic paper is needed which has good absorbability for such water-base adhesives or water-base inks and for water that serves as the solvent for these. Some types of synthetic paper have heretofore been proposed (JP-A-2001-181423, 2001-226507, 2001-164017, 2001-151918, 10-212367), some of which are used in glue labels or inkjet recording mediums.

Such conventional synthetic paper is characterized in that its water absorption is large, but on the other hand, it is problematic in that the rapid driability on the substrate surface thereof is unsatisfactory, concretely, the water absorption rate on the water-absorbing surface thereof is not high. Accordingly, conventional synthetic paper is unsatisfactory for use in glue labels that require rapid driability of water-base adhesives thereon. For example, when high-speed bottle labeling is tried with conventional synthetic paper, then satisfactory initial label adhesion could not be attained and labels may shift or peel away during transportation of bottles. Accordingly, there is a substantial problem in that the bottle-labeling speed is difficult to increase and the production cost could not be reduced. In addition, in a process of printing patterns or letters with a water-base ink, the printing speed could not be satisfactorily increased when conventional synthetic paper is used.

In consideration of these problems with the related art as above, an object of the present invention is to provide a stretched resin film which has good water absorbability and is excellent in rapid driability of a water-base adhesive and water-base ink applied thereto.

2. For recording mediums for inkjet recording paper, thermal recording paper, thermal transfer receiving paper, pressure-sensitive transfer recording paper, paper for outdoor exhibition posters and various labels that require water resistance, weather resistance and durability, heretofore proposed are those fabricated by coating a stretched resin film with a water-base coating agent in various coating lines, in which the stretched resin film includes synthetic paper fabricated in a process of film formation that comprises blending a polyolefin-based resin or a polyester-based resin with an inorganic fine powder or an organic filler followed by forming the resulting blend into a film and stretching it, and a transparent stretched film of essentially a polyester-based resin (see JP-A-10-188188, claim 1; JP-A-2001-181423, paragraphs [0079] to [0083]; JP-A-2001-246830, claim 1; JP-A-2001-253166, claim 1; JP-A-2002-46346, claim 1; JP-A-2002-46350, claim 1; JP-A-2002-46351, claim 1; JP-A-5-124335, claim 1; JP-A-5-1969806, claim 1; JP-A-5-169804, claim 1). However, many cases of these that are fabricated by coating the surface of such a stretched resin film with a water-base coating agent are problematic in that, since the water absorbability of the stretched resin film is insufficient, the coating agent is repelled and becomes uneven owing to the poor wettability of the stretched resin film with the water-base coating agent, and the adhesiveness between the coating layer and the stretched resin film is poor.

To solve these problems, the surface of the stretched resin film must be previously undercoated with a wettability improver or an anchor-coating agents. The additional undercoating step increases the production cost. When the wettability of the stretched resin film with an aqueous solution is not good or when the ability of the film to absorb an aqueous solution is poor, then the viscosity and the solid concentration of the water-base coating agent will have to be controlled.

Another object of the invention is to provide a stretched resin film coated with a water-base coating layer, of which the advantages are that, when the film is coated with the water-base coating layer, it is free from a problem of coating agent repellency and unevenness even though it is not undercoated with an anchor-coating agent heretofore needed in in-line and/or out-line coating of stretched resin films, and therefore the limitation on the water-base coating agent applicable to the stretched resin film for use in the invention is relieved and the adhesiveness of the coating layer to the film is thereby increased.

3. In-mold labels have heretofore been developed, which are used in the field that requires water resistance, chemical resistance and durability. For example, they include labels fabricated by coating one surface of a white film (synthetic paper) formed of a stretched or unstretched transparent polyolefin-based resin film or a stretched or unstretched, inorganic fine powder or organic filler-containing polyolefin-based resin film, with a heat-seal resin layer in a mode of coextrusion for film formation (JP-A-2-84319), labels fabricated by attaching or laminating a previously-embossed heat-seal resin film onto a substrate, and labels fabricated by coating a substrate with a heat-seal resin in various coating lines (JP-A-2-122914), and some of them have been commercialized.

Such conventional in-mold labels require embossing on the surface of the heat-resin layer, attaching or laminating a previously-embossed film onto a substrate, or forming a trapezoidal pattern in labeling, in order to remove the air trapped in a space between the container and the label in the in-mold process of producing labeled containers. When a pattern for air removal could not be formed on the surface of containers, then a method is proposed which comprises forming small holes in the label so as to remove air through them (JP-A-2-108516) However, any of these additional steps complicates the production process and could not evade various problems in that the producibility lowers, the number of failed products increases and the production cost increases.

In the conventional process where a heat-seal resin layer is formed through coextrusion in the step of producing in-mold labels, there occurs a problem in that the usable heat-seal resin is naturally limited depending on the heat resistance, the corrosion resistance and the viscosity behavior in melt of the resin.

In the other conventional process where a substrate is coated in various coating lines, when the surface of a previously-embossed stretched resin film is coated with a heat-seal resin (JP-A-5-249895), then there occurs a problem in that, since the solvent absorbability of the stretched resin film is poor, most of the coating agent gathers in the recesses of the embossed stretched resin film in the step of drying it, and, as a result, the embossed pattern is difficult to reproduce on the coated surface. When a film of no water absorbability is used, then a method may be employed which comprises applying a high-viscosity coating agent of a hot-melt resin or a solvent-type heat-seal resin to the film by the use of a gravure-coating machine to thereby make the film have a trapezoidal pattern of the embossing roll cells. Even in this case, however, such high-viscosity coating is indispensable and there still occurs a problem in that the production cost increases owing to the reduction in the producibility and another problem with the case is that the organic solvent used may cause firing and environmental pollution.

Still another object of the invention is to omit the necessity of the additional step of forming a specific pattern on the surface of a heat-seal coating layer or forming small through-holes in the layer in forming the layer on the surface of a stretched resin film. Still another object of the invention is to provide a stretched resin film of good producibility and good in-mold labelability, of which the advantages are that the latitude in selecting the material of constituting the heat-seal resin coating layer for it can be broadened and the limitation on the coating and processing equipment for it is relieved. Still another object of the invention is to provide an in-mold label having excellent functions and to provide in-mold containers with the label stuck thereto.

4. For various drink containers, these days used are one-way containers that are recycled from a melt of recovered material or cullet, and returnable containers that are collected, washed and reused, after used. Especially for recycle society in consideration of environmental harmony, it is believed that use of returnable containers of low environmental load, which require small energy consumption and save natural resources and wastes, may further increase in future rather than one-way containers.

Beer bottles used in large quantities as such returnable containers are generally labeled for the purpose of improving their design decoration. One general structure of conventional returnable bottle labels comprises an aluminium deposition layer formed on one surface of natural paper for improving the water resistance and the design decoration thereof, and a water-base adhesive applied on the other surface thereof, and the label of the type is stuck to a bottle via the water-base adhesive thereof. In the step of reusing the returnable bottles, the recovered bottles are washed with water for pretreatment and then washed with a sodium hydroxide solution heated at 70° C. or so for dissolving the aluminium deposition layer. This is for completely removing the label from the bottles (delabeling). However, the delabeling process has various problems in that the sodium hydroxide solution is harmful to human bodies, dissolution of the aluminium deposition layer and washing inside the bottles produce wastes, repeated use of the sodium hydroxide solution for about 1 year produces a problem in sanitation, and the glass bottles themselves are corroded. Accordingly, it is desired to develop a label that may be readily delabeled merely by washing with water for pretreatment, not requiring use of heated sodium hydroxide solution.

Conventional labels are formed of natural paper, and therefore require the aluminium deposition layer for making them resistant to water and for improving their design decoration. In that situation, it may be considered to use film-type synthetic paper of good water resistance in order to omit the aluminium deposition layer on it. In general, however, film-type synthetic paper has poor water absorbability and is therefore problematic in that a water-base adhesive is difficult to use for it.

On the other hand, there are proposed synthetic paper suitable for water-base inkjet recording paper of good water absorbability (JP-A-2001-226507, 2002-96422, 2001-164017, 2001-151918, 2001-181423), and synthetic paper to which water-base adhesives are applicable (JP-A-10-212367). However, even when such synthetic paper is used, it is still difficult to produce labels that are readily delabelable by washing with water alone.

In consideration of the problems with the related art as above, still another object of the invention is to provide a label that is readily delabelable by washing with water alone, not requiring washing with a heated sodium hydroxide solution in a process of removing it from returnables.

SUMMARY OF THE INVENTION

We, the present inventors have assiduously studied for the purpose of solving the problems as above, and, as a result, have found that a liquid absorption coefficient defined in the Bristow water absorption test according to Japan TAPPI No. 51-87 (in the invention, this is a liquid absorption coefficient for 40 milliseconds from the start of water absorption to the lapse of 20 milliseconds) is an important factor, or that is, the liquid absorption coefficient must be at least 5 ml/$(m^2 \cdot ms^{1/2})$. On the basis of this finding, we have completed the present invention.

The first aspect of the invention relates to a stretched resin film having a liquid absorption coefficient of at least 5 ml/$(m^2 \cdot ms^{1/2})$. Preferably, the stretched resin film of the invention has a surface porosity of at least 7%. Also preferably, it is stretched in at least one direction and has an areal draw ratio of from 2 to 80 times. Still preferably, the stretched resin film of the invention contains a thermoplastic resin (A), an inorganic fine powder (B) surface-treated with at least one surface-treating agent (D), and a dispersant (C). Preferably, the surface-treating agent (D) is for hydrophilicating the surface of the inorganic fine powder (B). More preferably, the film contains from 0.01 to 100 parts by weight of a dispersant (C) relative to 100 parts by weight of a resin composition comprising from 20 to 80% by weight of a thermoplastic resin (A), from 80 to 20% by weight of an inorganic fine powder (B) and from 0 to 50% by weight of an organic filler (B').

Preferably, the dispersant (C) to be in the stretched resin film of the invention is an acid-modified polyolefin (preferably having a degree of acid modification of from 0.01 to 20%) and/or a silanol-modified polyolefin. Also preferably, the thermoplastic resin (A) is a polyolefin-based resin. Also preferably, the surface-treating agent (D) is a water-soluble cation copolymer and/or a water-soluble anionic surfactant. Preferably, the water-soluble cation copolymer comprises constitutive units of a diallylamine salt and/or an alkyldiallylamine salt, and a nonionic hydrophilic vinyl monomer.

The stretched resin film of the invention may have a laminate structure constructed by laminating any other resin film on the stretched resin film that satisfies the above-mentioned condition. More preferably, the laminate structure has the stretched resin film that satisfies the above-mentioned condition, as the outermost layer thereof. The stretched resin film of the invention may have a single-layered structure or a multi-layered structure so far as it satisfies the above-mentioned condition.

Preferably, the stretched resin film of the invention has an opacity of from 10 to 100%.

The invention also provides a laminate structure constructed by laminating the stretched resin film that satisfies the above-mentioned condition, onto a material except the resin film. Preferably, the laminate structure of the invention has an opacity of from 10 to 100%. The invention includes a glue label that comprises the above-mentioned, stretched resin film or laminate structure.

The second aspect of the invention relates to a stretched resin film constructed by providing a water-base coating layer (E) on at least one surface of the stretched resin film of the first aspect of the invention.

The application of the water-base coating agent onto the surface of the stretched resin film may be effected either (or both) in an in-line process and/or an out-line process. Preferably, the water-base coating layer is a pigment coating layer.

The stretched resin film to be coated with the water-base coating layer (E) in the invention may have a laminate structure constructed by laminating any other resin film on it or a laminate structure constructed by laminating the film on any other material, so far as it satisfies the above-mentioned condition.

The stretched resin film of the invention may have a single-layered structure or a multi-layered structure so far as it satisfies the above-mentioned condition.

The invention also includes a recording material that comprises the above-mentioned, water-base coating layer (E)-coated, stretched resin film or laminate structure.

The third aspect of the invention relates to a stretched resin film constructed by providing a water-base heat-seal resin coating layer (E') on the stretched resin film of the first aspect of the invention.

Preferably, the water-base heat-seal resin coating layer (E') is provided thereon by applying a water-base dispersion to the film. Also preferably, the dispersion has a mean particle size of larger than the mean pore size in the surface of the stretched resin film.

Preferably, the surface of the coating layer formed by applying a heat-seal resin onto the film followed by drying it has a particle morphology of the dispersion. Also preferably, the heat-seal resin has a phase transition temperature falling between 50 and 140° C. The application of the water-base heat-seal resin coating agent onto the surface of the film may be effected either (or both) in an in-line process and/or an out-line process.

The stretched resin film to be coated with the water-base heat-seal resin coating layer (E') in the invention may have a laminate structure constructed by laminating the film onto any other film or any other material, so far as it satisfies the above-mentioned condition. Preferably, it has a laminate structure with any other resin film, which is constructed in such a manner that the substrate film coated with the water-base heat-seal resin coating layer (E') is the outermost layer of the laminate structure. Accordingly, the stretched resin film of the invention that has the water-base heat-seal resin coating layer (E') as the outermost layer thereof may have a single-layered structure or a multi-layered structure. The invention includes a modification that has a decoration of printed patterns and/or letters on the surface of the film opposite to the side thereof coated with the water-base heat-seal resin coating layer (E'), so far as it satisfies the above-mentioned condition.

The invention also includes an in-mold label that comprises the above-mentioned stretched resin film, and an in-mold container with the label stuck thereto.

The fourth aspect of the invention relates to a delabelable label constructed by forming a water-base adhesive layer on at least one surface of the stretched resin film of the first aspect of the invention, which is characterized in that, when it is stuck to an object via the water-base adhesive layer thereof and when the labeled object is washed with water at a water pressure of 2 MPa, then the label removes from the object within 60 seconds from the start of the washing.

Preferably, the stretched resin film has a multi-layered structure. Also preferably, the stretched resin film is coated with a metal layer on the side thereof opposite to the water-base adhesive layer-coated side, for the purpose of improving the design decoration of the label. Preferably, the water-base adhesive contains at least one selected from a group consisting of starch, glue, casein, cellulose, sodium alginate, guar gum, latex, polymaleic acid-type polymer, polyvinyl alcohol, polyvinylpyrrolidone, carboxymethyl cellulose, methyl cellulose, gelatin, pullulane, acrylic resin, urethane resin and vinyl acetate resin.

The invention also provides an object with the delabelable label stuck thereto. In particular, the invention provides a container formed of a material selected from a group consisting of metals, glass, plastics, ceramics and paper, which is labeled with the above-mentioned label.

BEST MODE FOR CARRYING OUT THE INVENTION

Figure 1:
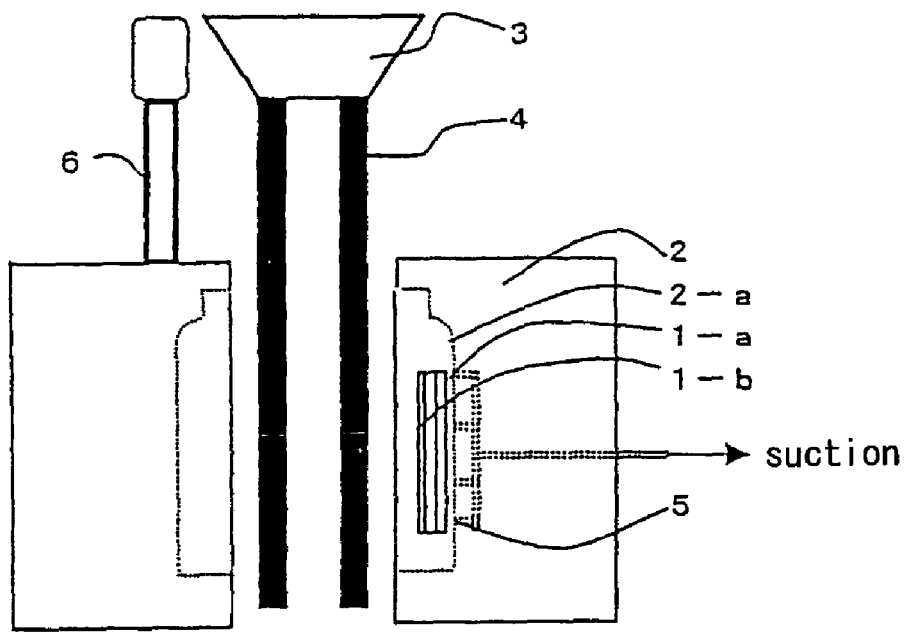
FIG. 1 is a cross-sectional view of a molding machine used in an in-mold label aptitude test for high-density polyethylene (HDPE) and high-impact polystyrene (HIPS). In the drawing, 1-a is a label print face; 1-b is a label adhesive face; 2 is a mold; 2-a is an inner wall; 3 is a die; 4 is a parison; 5 is a suction hole; 6 is an air-jet nozzle.

The stretched resin film of the invention is described in detail hereinunder. In this description, the numerical range expressed by the wording "a number to another number" means the range that falls between the former number indicating the lowermost limit of the range and the latter number indicating the uppermost limit thereof.

[Thermoplastic Resin (A)]

The thermoplastic resin (A) for use in the stretched resin film of the invention includes crystalline polyolefin-based resins, for example, crystalline ethylene-based resins such as high-density polyethylene, middle-density polyethylene, low-density polyethylene; crystalline propylene-based resin;

polymethyl-1-pentene, ethylene-cyclic olefin copolymers; polyamide-based resins such as nylon-6, nylon-6,6, nylon-6,10, nylon-6,12; thermoplastic polyester-based resins such as polyethylene terephthalate and its copolymers, polyethylene naphthalate, aliphatic polyesters; and other thermoplastic resins such as polycarbonates, atactic polystyrene, syndiotactic polystyrene, polyphenylene sulfide. Two or more of these may be combined for use herein.

Of those, preferred are crystalline polyolefin-based resins from the viewpoint of the chemical resistance and the production cost thereof; and more preferred are crystalline propylene-based resins.

The crystalline polyolefin-based resins show crystallinity. Preferably, they have a degree of crystallinity of at least 20%, more preferably from 35 to 75%. When the crystalline resin is used to form a film and when the film is stretched, then the stretched resin film may have enough pores in its surface. The degree of crystallinity may be determined through X-ray diffractiometry or IR spectrometry.

The crystalline propylene-based resins are preferably propylene homopolymers that are isotactic or syndiotactic polymers. Also usable herein are propylene-based copolymers having a different degree of stereo specificity, that are prepared through copolymerization of propylene with an α-olefin such as ethylene, 1-butene, 1-hexene, 1-heptene, 4-methyl-1-pentene. The copolymers may be binary, ternary or more polynary ones, and may also be random copolymers or block copolymers.

The content of the thermoplastic resin (A) in the stretched resin film of the invention may be generally from 20 to 80% by weight, but preferably from 25 to 75% by weight.

[Inorganic Fine Powder (B) and Organic Filler (B')]

Examples of the inorganic fine powder (B) that may be used in the stretched resin film of the invention include heavy calcium carbonate, precipitated calcium carbonate, calcined clay, talc, titanium oxide, barium sulfate, aluminium sulfate, silica, zinc oxide, magnesium oxide, diatomaceous earth, silicon oxide, silica; composite inorganic fine powder having an aluminium oxide or hydroxide around nuclei of hydroxyl group-containing inorganic fine powder; and hollow glass beads.

The content of the inorganic fine powder (B) in the stretched resin film of the invention may be generally from 20 to 80% by weight, but preferably from 25 to 75% by weight.

If the content of the inorganic fine powder (B) is larger than 80% by weight, then the film may be difficult to stretch. On the contrary, if the content is smaller than 20% by weight, then the film could not have the desired surface porosity and the improvement in its liquid absorbability would be insufficient.

For pore formation with it, the organic filler (B') is preferably selected from resins that are incompatible with the above-mentioned thermoplastic resin and have a higher melting point or glass transition point than the thermoplastic resin. Examples of the organic filler include polyethylene terephthalate, polybutylene terephthalate, polyamide, polycarbonate, polyethylenenaphthalate, polystyrene, acrylate or methacrylate polymer and copolymer, melamine resin, polyphenylene sulfite, polyimide, polyethyl ether ketone, polyphenylene sulfide, cyclic olefin homopolymer, and cyclic olefin-ethylene copolymer. In particular, when a polyolefin-based resin is used as the above-mentioned thermoplastic resin (A), then the organic filler to be used for it is preferably selected from polyethylene terephthalate, polybutylene terephthalate, polyamide, polycarbonate, polyethylene naphthalate, polystyrene, cyclic olefin homopolymer, and cyclic olefin-ethylene copolymer.

The content of the organic filler (B') in the stretched resin film of the invention may be generally from 20 to 50%, but preferably from 0 to 40% by weight.

The mean particle size of the inorganic fine powder or the mean dispersion particle size of the organic filler for use in the invention is preferably from 0.01 to 30 μm, more preferably from 0.1 to 20 μm, even more preferably from 0.5 to 15 μm. In view of the easiness in mixing it with thermoplastic resin (A), the particle size is more preferably at least 0.1 μm. If the particle size is smaller than 0.1 μm, then pores will be difficult to form in the stretched film and the stretched film could not have the desired surface condition. If the mean particle size is larger than 20 μm, then the stretchability of the film will be poor and the film may be frequently broken when stretched.

One embodiment of determining the mean particle size of the inorganic fine powder for use in the invention is described. Using a particle sizer, for example, a laser diffraction-type particle sizer Microtrack (trade name by Nikkiso KK), the particles are analyzed, and the data of cumulative 50% particles are computed to obtain the mean particle size in terms of the 50% cumulative particle size of the particles. The particle size of the organic filler dispersed in thermoplastic resin by melt kneading and dispersing it in the resin may be determined as follows. The cross section of the stretched resin film to be analyzed is observed with an electronic microscope, and at least 10 particles seen in the field of view are measured. Their data are averaged to obtain the mean particle size of the particles.

For the stretched resin film of the invention, one may be selected from the above and may be used alone, or two or more may be selected and combined for use therein. When two or more are selected, combined and used, then an inorganic fine powder and an organic filler may be combined.

[Dispersant (C)]

The dispersant (C) for use in the stretched resin film of the invention includes, for example, an acid-modified polyolefin and a silanol-modified polyolefin. Of these, preferred is an acid-modified polyolefin. The acid-modified polyolefin includes acid anhydride group-containing polyolefins produced through random copolymerization or graft copolymerization with maleic anhydride; carboxylic acid group-containing polyolefins produced through random copolymerization or graft copolymerization with an unsaturated carboxylic acid such as methacrylic acid or acrylic acid; and epoxy group-containing polyolefins produced through random copolymerization or graft copolymerization with glycidyl methacrylate. Concretely, they are maleic anhydride-modified polypropylene, maleic anhydride-modified polyethylene, acrylic acid-modified polypropylene, ethylene/methacrylic acid random copolymer, ethylene/glycidyl methacrylate random copolymer, ethylene/glycidyl methacrylate graft copolymer, glycidyl methacrylate-modified polypropylene. Of those, preferred are maleic anhydride-modified polypropylene and maleic anhydride-modified polyethylene.

Specific examples of maleic anhydride-modified polypropylene and maleic anhydride-modified polyethylene are Mitsubishi Chemical's Modic AP[P513V] (trade name), Modic AP[M513] (trade name); Sanyo Chemical Industry's Yumex 1001 (trade name), Yumex 1010 (trade name), Yumex 2000 (trade name); and Mitsui DuPont Polychemical's HPR [VR101] (trade name).

Preferably, the acid-modified polyolefin has a degree of acid modification of from 0.01 to 20%, more preferably from 0.05 to 15%, even more preferably from 0.1 to 10%.

If the degree of acid modification is smaller than 0.01%, then the dispersibility of the surface-treated inorganic fine powder in thermoplastic resin may be insufficient; but if larger than 20%, then the softening point of the acid-modified polyolefin may be too low and the polymer may be difficult to compound with thermoplastic resin.

The content of the dispersant (C) in the stretched resin film of the invention may be generally from 0.01 to 100 parts by weight, but preferably from 0.05 to 90 parts by weight, more preferably from 0.1 to 80 parts by weight, relative to 100 parts by weight of the resin composition that comprises the thermoplastic resin (A) and the inorganic fine powder (B).

If the content of the dispersant (C) is smaller than 0.01 parts by weight, then the surface-treated inorganic fine powder could not be dispersed sufficiently and, as a result, the film could not have the desired surface porosity and the improvement in its liquid absorbability would be insufficient. On the contrary, if the content is larger than 100 parts by weight, then the stretchability of the film may greatly lower and the film may be frequently broken when stretched.

[Surface-Treating Agent (D)]

Preferably, the surface-treating agent (D) for the inorganic fine powder (B) for use in the invention is to hydrophilicate the surface of the powder.

Also preferably, the surface-treating agent (D) is a copolymer (water-soluble cation copolymer) of a monomer (d1) selected from diallylamine salts and alkyldiallylamine salts, and a nonionic hydrophilic vinyl monomer (d2). The anion to form the "salt" is preferably selected from a chloride ion, a bromide ion, a sulfate ion, a nitrate ion, a methylsulfate ion, an ethylsulfate ion, a methanesulfonate ion.

Specific examples of (d1) are diallylamine salts, and alkyldiallylamine salts and dialkyldiallylamine salts in which the alkyl group has from 1 to 4 carbon atoms, for example, methyldiallylamine salts, ethyldiallylamine salts, dimethyldiallylamine salts; methacryloyloxyethyltrimethylammonium, acryloyloxyethyltrimethylammonium, methacryloyloxyethyldimethylethylammonium and acryloyloxyethyldimethylethylammonium chlorides, bromides, methsulfates and ethsulfates; and other quaternary ammonium salts obtained through alkylation of N,N-dimethylaminoethyl methacrylate or N,N-dimethylaminoethyl acrylate with an epoxy compound such as epichlorohydrin, glycidol or glycidyltrimethylammonium chloride. Of those, especially preferred are diallylamine salts, methyldiallylamine salts and dimethyldiallylamine salts.

Specific examples of (d2) are acrylamide, methacrylamide, N-vinylformamide, N-vinylacetamide, N-vinylpyrrolidone, 2-hydroxyethyl methacrylate, 2-hydroxyethyl acrylate, 2-hydroxy(meth)acrylate, 3-hydroxypropyl(meth)acrylate, methyl(meth)acrylate, ethyl(meth)acrylate, butyl (meth)acrylate. Of those, preferred are acrylamide and methacrylamide.

The copolymerization ratio of (d1) to (d2) may be any desired one. Its preferred range is as follows: (d1) is from 10 to 99 mol %, more preferably from 50 to 97 mol %, even more preferably from 65 to 95 mol %; and (d2) is from 1 to 90 mol %, more preferably from 3 to 50 mol %, even more preferably from 5 to 35 mol %.

The surface-treating agent (D) may be obtained from (d1) and (d2), as follows: The monomer mixture is reacted at 40° C. to 100° C. (for example, at 50 to 80° C.) for 2 to 24 hours in the presence of a polymerization initiator such as ammonium persulfate or 2,2-azobis(2-amidinopropane)dihydrochloride. The polymer may be produced according to the method described in JP-A-5-263010 and 7-300568, and it may be used for attaining the object of the invention. A part of those described in JP-A-57-48340 and 63-235377 may also be used. Of those, preferred for use herein are copolymers of diallylamine or diallyldimethylamine hydrochloride or sulfate with methacrylamide or acrylamide.

The molecular weight of the polymer is described. The limiting viscosity number of the polymer in an aqueous 1 N sodium chloride solution at 25° C. may be generally from 0.05 to 3, but preferably from 0.1 to 0.7, more preferably from 0.1 to 0.45. The weight-average molecular weight of the polymer measured through gel permeation chromatography may be from about 5,000 to 950,000, but preferably from 10,000 to 50,000, more preferably from 10,000 to 80,000.

The surface-treating agent (D) that comprises a water-soluble anionic surfactant has an anionic functional group in the molecule. Its specific examples are (d3) sulfonic acid salts with a hydrocarbon group having from 4 to 40 carbon atoms, (d4) phosphate salts with a hydrocarbon group having from 4 to 40 carbon atoms, salts of mono or diphosphates of higher alcohols having from 4 to 40 carbon atoms, and (d5) alkylbetaines and alkylsulfobetaines with a hydrocarbon group having from 4 to 40 carbon atoms. These are suitably selected so as to attain the effect of the invention. The "salt" of (d3) and (d4) includes lithium salts, sodium salts, potassium salts, calcium salts, magnesium salts, primary to quaternary ammonium salts, and primary to quaternary phosphonium salts. Of the salts, preferred are lithium salts, sodium salts, potassium salts, quaternary ammonium salts; and more preferred are sodium salts and potassium salts.

Sulfonic acid salts (d3) with a hydrocarbon group having from 4 to 40 carbon atoms include sulfonic acid salts and sulfoalkanecarboxylic acid salts with a linear, branched or cyclic-structured hydrocarbon group having from 4 to 40 carbon atoms, preferably from 8 to 20 carbon atoms. Concretely, they are alkylbenzenesulfonic acid salts having from 4 to 40 carbon atoms, preferably from 8 to 20 carbon atoms; naphthalenesulfonic acid salts; linear, branched or cyclic-structured alkylnaphthalenesulfonic acid salts having from 4 to 30 carbon atoms, preferably from 8 to 20 carbon atoms; diphenyl ether or biphenyl sulfonic acid salts with a linear or branched alkyl group having from 1 to 30 carbon atoms, preferably from 8 to 20 carbon atoms; alkylsulfate salts having from 1 to 30 carbon atoms, preferably from 8 to 20 carbon atoms; sulfoalkanecarboxylate salts; sulfonic acid salts of alkyl alcohol-alkylene oxide adducts having from 8 to 30 carbon atoms, preferably from 10 to 20 carbon atoms.

Their specific examples are alkanesulfonic acid salts and aromatic sulfonic acid salts, such as octanesulfonic acid salts, dodecanesulfonic acid salts, hexadecanesulfonic acid salts, octadecanesulfonic acid salts, 1- or 2-dodecylbenzenesulfonic acid salts, 1- or 2-hexadecylbenzenesulfonic acid salts, 1- or 2-octadecylbenzenesulfonic acid salts, various isomers of dodecylnaphthalenesulfonic acid salts, salts of β-naphthalenesulfonic acid-formalin condensate, various isomers of octylbiphenylsulfonic acid salts, dodecyldiphenylether-sulfonic acid salts, dodecyllignin-sulfonic acid salts; alkylsulfate salts such as dodecylsulfate salts, hexadecylsulfate salts; sulfoalkanecarboxylic acid salts such as sulfosuccinic acid dialkyl esters in which the alkyl group is a linear, branched or cyclic-structured alkyl group having from 1 to 30, preferably from 4 to 20 carbon atoms, more concretely, di(2-ethylhexyl) sulfosuccinate salts, N-methyl-N-(2-sulfoethyl)alkylamide salts (in which the alkyl group has from 1 to 30, preferably from 12 to 18 carbon atoms), for example, amide compounds derived from N-methyltaurine and oleic acid, 2-sulfoethyl carboxylate salts having from 1 to 30, preferably from 10 to 18 carbon atoms; laurylsulfate triethanolamine, ammonium laurylsulfate, polyoxyethylene laurylsulfate salts, polyoxyethylene cetylsulfate salts; sulfonic acid salts of alkyl alcohol/alkylene oxide adducts having from 8 to 30 carbon atoms, preferably from 10 to 20 carbon atoms, for example, sulfate salts of lauryl alcohol/ethylene oxide adduct, sulfate salts of cetyl alcohol/ethylene oxide adduct, and sulfate salts of stearyl alcohol/ethylene oxide adduct.

Mono, di or triphosphate salts (d4) with a linear, branched or cyclic-structured hydrocarbon group having from 4 to 40 carbon atoms are preferably those having from 8 to 20 carbon atoms. Their specific examples are dodecyl phosphate disodium salt or dipotassium salt; hexadecyl phosphate disodium salt; didodecyl phosphate disodium salt or potassium salt; dihexadecyl phosphate sodium salt or potassium salt; and triphosphate of dodecyl alcohol/ethylene oxide adduct.

Specific examples of alkylbetaines and alkylsulfobetaines (d5) with a hydrocarbon group having from 4 to 30 carbon atoms, preferably from 10 to 20 carbon atoms are lauryldimethylbetaine, stearyldimethylbetaine, dodecyldimethyl(3-sulfopropylene)ammonium inner salt, cetyldimethyl(3-sulfopropyl)ammonium inner salt, stearyldimethyl(3-sulfopropyl)ammonium inner salt, 2-octyl-N-carboxymethyl-N-hydroxyethylimidazolium betaine, 2-lauryl-N-carboxymethyl-N-hydroxyethylimidazolium betaine.

Of those, preferred is (d3); and more preferred is one selected from alkanesulfonic acid salts having from 10 to 20 carbon atoms, aromatic sulfonic acid salts with an alkyl group having from 10 to 20 carbon atoms, and sulfate salts of alkyl alcohol/alkylene oxide adduct having from 10 to 20 carbon atoms.

[Method of Surface Treatment of Inorganic Fine Powder]

In the invention, the inorganic fine powder may be subjected to surface treatment with at least one surface-treating agent (D). Various known methods may be employed for the surface treatment with no specific limitation. The mixing device, and the temperature and the time for mixing may be suitably selected and determined depending on the properties and the physical condition of the components of the surface-treating agent to be used. The ratio L/D (length/diameter) of the mixing machine to be used, the shape of the stirring blade, the shear rate, the specific energy, the residence time, the treatment time and the treatment temperature may also be suitably selected and determined depending on the properties of the components to be used.

One example of surface treatment of calcium carbonate prepared in a mode of wet grinding is described. 100 parts by weight of calcium carbonate particles having a particle size of from 10 to 50 μm are wet-ground in an aqueous medium in the presence of a necessary amount of a surface-treating agent, and the thus-processed particles may have a desired particle size. Concretely, an aqueous medium is added to calcium carbonate in a ratio by weight, calcium carbonate/aqueous medium (concretely water) falling between 70/30 and 30/70, preferably between 60/40 and 40/60; and from 0.01 to 10 parts by weight, preferably from 0.1 to 5 parts by weight, in terms of the solid content thereof relative to 100 parts by weight of calcium carbonate, of a cationic copolymer dispersant is added to it, and these are wet-ground in an ordinary manner. Alternatively, an aqueous medium containing the above-mentioned amount of a surface-treating agent is previously prepared by dissolving the agent in the medium, and this may be mixed and wet-ground with calcium carbonate also in an ordinary manner.

The wet-grinding may be effected either in a batch mode or in a continuous mode, for which preferably used is a grinding mill such as sand mill, attritor or ball mill. Thus wet-ground, calcium carbonate is obtained having a mean particle size of from 0.1 to 20 μm, preferably from 0.5 to 15 μm.

Next, the wet-ground product is dried. Before dried, it may be classified to remove 350 mesh-on coarse particles. The drying may be effected in any known manner, for example, in a mode of drying with hot air or drying by spraying. Preferred for it is medium-fluidized drying. The medium-fluidized drying is as follows: A slurry substance to be dried is fed into medium particles that are fluidized with hot air (80 to 150° C.) in a drying column (fluidized layer), then the thus-fed slurry substance is dispersed in the fluidized drying phase while it film wise adheres to the surface of the actively-fluidized medium particles, and this is dried with the hot air in the column. In that manner, various substances is dried in the column. The medium-fluidized drying of the type may be readily attained, for example, by the use of a medium-fluidized drying apparatus, Nara Kikai Seisakusho's "Media Slurry Drier". The medium-fluidized drying mode is preferred since it attains both drying and grinding of aggregated particles (removal of primary particles). When the wet-ground slurry obtained herein is dried according to the medium-fluidized method of the type, then it gives calcium carbonate having an extremely small quantity of coarse powder. However, after the medium-fluidized drying step, it may also be effective to grind and classify the dried particles according to a desired method. On the other hand, when the wet-ground product is dried with hot air in an ordinary manner, in place of being dried according to the mode of medium-fluidized drying, then it is desirable that the resulting cake is further ground and classified according to a desired method.

The dried cake of the wet-ground product obtained according to the method is well crushable, and it may readily give surface-treated calcium carbonate. Accordingly, the dried cake does not require any additional step of grinding it.

The surface-treated, calcium carbonate fine particles thus obtained in the manner as above may be further treated with any other surface-treating agent, if desired.

The amount of the surface-treating agent (D) may vary depending on the use of the stretched resin film of the invention. In general, it may be from 0.01 to 10 parts by weight, but preferably from 0.04 to 5 parts by weight, more preferably from 0.07 to 2 parts by weight relative to 100 parts by weight of the inorganic fine powder. If the amount thereof is smaller than 0.01 parts by weight, then the agent may be ineffective for surface treatment; but even if larger than 10 parts by weight, the effect of the surface-treating agent would not increase any more.

[Blend Ratio of Constitutive Components]

The preferred blend ratio of the constitutive components of the stretched resin film of the invention is as follows: From 0.01 to 100 parts by weight of a dispersant (C) is added to 100 parts by weight of a total of the resin composition that comprises from 20 to 80% by weight of a thermoplastic resin (A), from 80 to 20% by weight of a surface-treated inorganic filler (B) and from 0 to 50% by weight of an organic filler. If the content of the inorganic finer powder and/or the organic filler is larger than 80% by weight, then films having a uniform thickness would be difficult to obtain; but if the content of the thermoplastic resin is larger than 80% by weight, then the water absorbability of the films obtained for water-base solvents or water-base inks may be poor.

If desired, the stretched resin film of the invention may contain any of heat stabilizer, UV stabilizer, antioxidant, antiblocking agent, nucleating agent, lubricant, dispersant, etc. Preferably, the amount of the additives is at most 3% by weight of the film.

[Production of Stretched Resin Film]

The stretched resin film of the invention may be produced by combining various methods known by those skilled in the art. Stretched resin films produced by any methods are all within the scope of the invention so far as they satisfy the condition as set forth in the claims.

The stretched resin film of the invention may be produced by mixing a thermoplastic resin (A), an inorganic fine powder (B) processed with a surface-treating agent (D), an organic filler (B') and a dispersant (C) in a predetermined ratio, then extruding the resulting mixture to give a sheet, and thereafter stretching the sheet monoaxially or biaxially at a temperature lower preferably by from 3 to 60° C. than the melting point of the thermoplastic resin (A). Thus produced, the film is a porous, stretched resin film having fine pores (voids) uniformly in the surface of the film and also inside the film.

The stretched resin film of the invention thus produced according to the method as above may have a surface porosity of its outermost layer, as measured according to the method mentioned below, of at least 7%, preferably from 10% to 30%. If the surface porosity is smaller than 7%, then the film could not have satisfactory water absorbability; but if larger than 30%, then the surface strength of the film may be low and the film may be problematic in its practical use.

The surface porosity means the aerial ratio of the pores in the surface of the stretched resin film of the invention observed with an electronic microscope.

Concretely, a sample is randomly cut out of the stretched resin film to be analyzed, and it is stuck to a sample bed. The surface of the sample is coated with gold or gold-palladium in a mode of vapor deposition, and this is observed with an electronic microscope (e.g., Hitachi's scanning microscope S-2400) at any desired power (e.g., ×500 to ×3000) to analyze the pores seen in the surface. A photographic picture of the observed region is taken, and the pores seen therein are traced onto a tracing film and fully stained thereon. The resulting image is processed with an image processor (Nireco's Model Luzex IID, and the a real ratio of the pores is the porosity in the surface of the stretched resin film analyzed.

The stretched resin film of the invention has a liquid absorption coefficient, as defined in the Bristow water absorption test according to Japan TAPPI No. 51-87 (in the invention, this is a liquid absorption coefficient for 40 milliseconds from the start of water absorption to the lapse of 20 milliseconds), of at least 5 ml/(m$^2$·ms$^{1/2}$), preferably at least 10 ml/(m$^2$·ms$^{1/2}$), more preferably from 15 to 50 ml/(m$^2$·ms$^{1/2}$). If the liquid absorption coefficient thereof is smaller than 5 ml/(m$^2$·ms$^{1/2}$), then the water absorbability of the film will be insufficient and the ink-drying capability of the film may be poor.

The stretched resin film of the invention may have a single-layered structure or a multi-layered structure. When the film has a multi-layered structure, then the entire film may satisfy the condition of the invention or at least one constitutive layer of the film may satisfy the condition of the invention. In the latter case, it is desirable that at least the outermost layer of the film satisfies the condition of the invention. In this case, the resin film to be laminated on the layer that satisfies the condition of the invention may be a stretched one or an unstretched one. When the layer is laminated with a stretched resin film, then the constitutive layers may be separately stretched and the laminated, or they may be first laminated and then stretched later at a time. These methods may be suitably combined for use herein. One example of the resin film to be laminated with the layer that satisfies the condition of the invention is a resin film not containing a surface-treated inorganic fine powder.

Preferably, the stretched resin film of the invention is stretched in at least one direction, and it may be biaxially stretched.

For example, a molten film of a resin composition that comprises a resin composition comprising from 20 to 80% by weight of a thermoplastic resin (A), from 80 to 20% by weight of a surface-treated inorganic filler (B) and from 0 to 50% by weight of an organic filler (B') and from 0.01 to 100 parts by weight, based on 100 parts by weight of the total weight of the resin composition, of a dispersant (C) is laminated on at least one surface of a monoaxially-stretched polyolefin-based resin film which contains from 0 to 40% by weight, preferably from 3 to 33% by weight of an inorganic fine powder and which has been stretched in one direction at a temperature lower than the melting point of the resin, and then the resulting laminate film is stretched in the direction perpendicular to the above-mentioned stretching direction. As a result, a laminate-structured stretched resin film is thus obtained, in which the outermost layer is laterally monoaxially oriented and the substrate layer is biaxially oriented. One preferred embodiment of the production includes the step of stretching the substrate layer and the outermost layer both at a time after they have been laminated. As compared with a case where the two are separately stretched and laminated, this embodiment is simple and the production cost for it is low.

Various known methods may be employed for stretching the film. Preferably, the stretching is effected at a temperature lower by from 3 to 60° C. or more than the melting point of the resin having the lowest melting point of all the resins used in the constitutive layers.

Concrete methods of stretching include roll-to-roll stretching to be attained by utilizing the peripheral speed difference between rolls, and a clip stretching to be attained by the use of a tenter oven.

Roll-to-roll stretching is favorable, since the draw ratio for stretching may be controlled in any desired manner and since films having any desired stiffness, opacity and glossiness can be readily obtained. The draw ratio for stretching is not specifically defined, and it may be determined in consideration of the use and the object of the stretched resin film of the invention and of the properties of the resins used. In general, it may be from 2 to 11 times, but preferably from 3 to 10 times, more preferably from 4 to 7 times.

In clip stretching to be attained by the use of a tenter oven, the draw ratio may be from 4 to 11 times, but preferably from 5 to 10 times. The areal draw ratio may be from 2 to 80 times, but preferably from 3 to 60 times, more preferably from 4 to 50 times. If the areal draw ratio is less than 2 times, then the stretched resin film could not have a predetermined surface porosity and could not have satisfactory water absorbability.

After stretched, the film is preferably subjected to heat treatment. Preferably, the temperature for the heat treatment is equal to the stretching temperature or is selected from a temperature range higher by 30° C. than the stretching temperature. The heat treatment reduces the thermal shrinkage in the stretched direction of the film, and solves the problems of tight winding of the film during storage of products and waving owing to shrinkage in thermal or fusion sealing of the film. The heat treatment may be effected generally by the use of a roll or a hot oven. If desired, these may be combined for the heat treatment. Preferably, the stretched film is subjected to heat treatment while it is kept stretched, as the mode produces a high treatment effect. If desired, the surface of the film may be subjected to corona treatment or plasma treatment, and its advantage is that the wettability of the water-absorbing surface of the film is improved and the water absorbability of the film is therefore improved.

The overall thickness of the stretched resin film to be produced herein is not specifically defined. In consideration of its absorbability for water-base solvent and water-base ink, the film preferably has an overall thickness of from 5 to 400 μm, more preferably from 15 to 350 μm, even more preferably from 25 to 300 μm.

The stretched resin film of the invention may be used directly as it is; or depending on its use, the film may be laminated onto any other material than resin film, for example, onto thermoplastic sheet, laminate paper, pulp paper, nonwoven fabric or cloth, and the resulting laminates may be used.

The stretched resin film of the invention, or the laminate constructed by laminating the stretched resin film of the invention onto any other material as an outermost layer may have an opacity of from 10% to 100%. The "opacity" as referred to herein is determined according to JIS Z-8722. Semitransparent films have an opacity of from 10% to less than 75%, preferably from 20 to 70%. Transparent films have an opacity of from 75 to 100%, preferably from 80 to 100%. If the opacity thereof is smaller than 10%, then the number of pores formed in the surface of the film and inside the film may be small and the film could not have the liquid absorption coefficient defined in the invention.

The stretched resin film of the invention, or the laminate structure of the invention having the stretched resin film as the outermost layer thereof may be used for glue labels, posters, envelopes, transportation vouchers, food sheets, coasters, etc.

[Water-Base Coating Layer (E)]

The water-base coating layer (E) in the invention is preferably a water-base pigment coating layer capable of forming letters and/or images, for which a coating layer suitable to a pattern-printing method or a letter-printing method may be selected and used.

The pigment coating agent to form the pigment coating layer comprises a combination of a binder resin, a pigment component, a monomer component and an oligomer component. Preferably, the water content of the pigment component is at least 30% by weight, more preferably at least 40% by weight, even more preferably at least 50% by weight.

Examples of the pigment coating layer for the water-base coating layer (E) in the invention are a combination of a known inorganic filler, a known printing ink and a binder resin suitable thereto for offset printing, gravure printing, flexographic printing, screen printing or letter-press printing; a combination of a known leuco dye and a developer for the coating layer for thermal recording paper; a combination of a binder resin, a water-absorbing pigment and an ink fixer for the coating layer for inkjet recording paper; and a combination of a known oleophilic pigment and a binder resin for the coating layer for fusing thermal transfer recording paper.

Examples of the coating layer for inkjet recording paper are mentioned. The water-absorbing pigment for the layer includes silica, calcium carbonate, aluminiumoxide, amorphous silica, pearl necklace-shaped silica, fibrous aluminium oxide and its hydrate, tabular aluminium oxide and its hydrate.

The binder resin includes water-soluble resins such as polyvinyl alcohol and its derivatives, polyvinylpyrrolidone and its derivatives, polyacrylamide, hydroxyethyl cellulose, casein, starch; and emulsions of water-insoluble resins such as urethane resins, ester resins, epoxy resins, ethylene resins, ethylene-vinyl acetate copolymer resins, vinyl acetate resins, vinyl chloride resins, vinyl chloride-vinyl acetate copolymers, vinylidene chloride resins, vinyl chloride-vinylidene chloride copolymer resins, acrylic acid resins, methacrylic acid resins, vinylbutyral resins, silicone resins, nitrocellulose resins, styrene-acrylic copolymers, styrene-butadiene copolymers, acrylonitrile-butadiene copolymers.

The ink fixer includes inorganic metal oxide hydrates such as aluminium oxide hydrate, zirconium oxide hydrate, tin oxide hydrate; aluminium hydroxide, aluminium sulfate, aluminium chloride, aluminium acetate, aluminium nitrate, zirconium sulfate, zirconium chloride, tin chloride; cationic silane coupling agents such as amino group-containing silane coupling agents, quaternary ammonium group-containing silane coupling agents; cationic zirconium coupling agents such as amino group-containing zirconium coupling agents, quaternary ammonium-containing zirconium coupling agents; cationic titanium coupling agents such as amino group-containing titanium coupling agents, quaternary ammonium group-containing titanium coupling agents; cationic glycidyl coupling agents such as amino group-containing glycidyl ethers, quaternary ammonium group-containing glycidyl ethers; polyalkylenepolyamines such as polyethylenimine, polypropylene-polyamine, and their derivatives; amino group or quaternary ammonium group-containing acrylic resins, amino group or quaternary ammonium salt-containing polyvinyl alcohols.

Of the above-mentioned water-absorbing pigments, binder resins and ink fixers, suitable ones may be selected and combined for use in the invention.

In addition, for improving the water resistance of the water-base coating layer (E), a crosslinking agent is preferably added to the binder resin. Preferred examples of the crosslinking agent are urea-formaldehyde resin, melamine-formaldehyde resin, polyamide-polyurea-formaldehyde resin, glyoxal, epoxy-type crosslinking agent, polyisocyanate resin, boric acid, borax, and various borates.

Also if desired, various auxiliary additives that are generally used in coated paper, such as dispersant, thickener, defoaming agent, preservative, UV absorbent, UV stabilizer, antioxidant, surfactant, antiblocking agent, may also be added to the layer.

Specific examples of the coating layer for thermal recording media that are applicable to the water-base coating layer (E) are mentioned. The leuco dye includes triarylmethane dyes such as 3,3-bis(p-dimethylaminophenyl)-6-dimethylaminophthalide, 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3,3-bis(1,2-dimethylindol-3-yl)-6-dimethylaminophthalide, 3,3-bis(9-ethylcarbazol-3-yl)-6-dimethylaminophthalide, 3,3-bis(2-phenylindol-3-yl)-6-dimethylaminophthalide, 3-p-dimethylaminophenyl-3-(1-methylpyrrol-3-yl)-6-dimethylaminophthalide;

diphenylmethane dyes such as 4,4'-bis-dimethylaminobenzhydryl benzyl ether, N-halophenyl-leucoauramine, N-2,4,5-trichlorophenyl-leucoauramine; thiazine dyes such as benzoylleucomethylene blue, p-nitrobenzoylleucomethylene blue; spiro dyes such as 3-methyl-spiro-dinaphthopyran, 3-ethyl-spiro-dinaphthopyran, 3-phenyl-spiro-dinaphthopyran, 3-benzyl-spiro-dinaphthopyran, 3-methyl-naphtho-(6'-methoxybenzo)spiropyran, 3-propyl-spiro-dibenzopyran; lactam dyes such as rhodamine-β-anilinolactam, rhodamine-(p-nitroanilino)lactam, rhodamine-(o-chloroanilino)lactam; and fluoran dyes such as 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-(N-ethyl-p-toluidino)-7-methylfluoran, 3-diethylamino-7-N-acetyl-N-methylaminofluoran, 3-diethylamino-7-N-methylaminofluoran, 3-diethylamino-7-dimethylaminofluoran, 3-diethylamino-7-N-methyl-N-benzylaminofluoran, 3-diethylamino-7-N-chloroethyl-N-methylaminofluoran, 3-diethylamino-7-N-diethylaminofluoran, 3-(N-ethyl-p-toluidino)-6-methyl-7-phenylaminofluoran, 3-(N-cyclopentyl-N-ethylamino)-6-methyl-7-anilinofluoran, 3-(N-ethyl-p-toluidino)-6-methyl-7-(p-toluidino)fluoran, 3-diethylamino-6-methyl-7-phenylaminofluoran, 3-diethylamino-7-(2-carbomethoxyphenylamino)fluoran, 3-(N-ethyl-N-isoamylamino)-6-methyl-7-phenylaminofluoran, 3-piperidino-6-methyl-7-phenylaminofluoran, 3-(N-cyclohexyl-N-methylamino)-6-methyl-7-phenylaminofluoran, 3-piperidino-6-methyl-7-phenylaminofluoran, 3-diethylamino-6-methyl-7-xylidinofluoran, 3-diethylamino-7-(o-chlorophenylamino)fluoran, 3-dibutylamino-7-(o-chlorophenylamino)fluoran, 3-pyrrolidino-6-methyl-7-p-butylphenylaminofluoran, 3-N-methyl-N-tetrahydrofurfurylamino-6-methyl-7-anilinofluoran, 3-N-methyl-N-tetrahydrofurfurylamino-6-methyl-7-anilinofluoran, 3-di(n-butyl)amino-6-methyl-7-anilinofluoran. One or more of these dyes may be suitably selected for use herein.

As the developer that reacts with the leuco dye for color formation, any known ones may be used. For example, they are inorganic acid substances such as activated clay, acid clay, attapulgite, bentonite, colloidal silica, aluminium silicate; phenolic compounds such as 4-tert-butylphenol, 4-hydroxydiphenoxide, α-naphthol, β-naphthol, 4-hydroxyacetophenol, 4-tert-octylcatechol, 2,2'-dihydroxydiphenol, 2,2'-methylenebis(4-methyl-6-tert-isobutylphenol), 4,4'-isopropylidenebis(2-tert-butylphenol), 4,4'-sec-butylidenediphenol, 4-phenylphenol, 4,4'-isopropylidenebis(2-tert-butylphenol), 4,4'-isopropylidenediphenol (bisphenol A), 2,2'-methylenebis(4-chlorophenol), hydroquinone, 4,4'-cyclohexylidenediphenol, benzyl 4-hydroxybenzoate, dimethyl 4-hydroxyphthalate, hydroquinone monobenzyl ether, novolak-type phenol resin, phenol polymer; aromatic carboxylic acids such as benzoic acid, p-tert-butylbenzoic acid, trichlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicylic acid, 3-isopropylsalicylic acid, 3-tert-butylsalicylic acid, 3-benzylsalicylic acid, 3-(α-methylbenzyl) salicylic acid, 3-chloro-5-(α-methylbenzyl)salicylic acid, 3,5-di-tert-butylsalicylic acid, 3-phenyl-5-(α,α-dimethylbenzyl)salicylic acid, 3,5-di-α-methylbenzylsalicylic acid; salts of the above-mentioned phenolic compound or aromatic carboxylic compound with a polyvalent metal such as zinc, magnesium, aluminium, calcium, titanium, manganese, tin or nickel. One or more of these may be suitably selected for use herein. Preferably, the amount of the developer to be used is from 1 to 20 parts by weight, more preferably from 1 to 5 parts by weight or so, relative to 1 part by weight of the dye.

For the binder resin, suitably usable are those exemplified hereinabove for the coating layer for inkjet technology.

In a thermal recording system, a heated thermal head is brought into direct contact with the coating layer for thermal recording media. Accordingly, it is desirable that the coating layer for thermal recording media contains a pigment serving as an antiblocking agent. Existing the pigment in the layer is also desirable for controlling the color development reaction and for preventing the heat of the thermal head from diffusing around it to cause blurry dots.

Examples of the pigment are inorganic particles such as kaolin, clay, calcium carbonate, calcined clay, calcined kaolin, diatomaceous earth, fine powdery anhydrous silica, activated clay; and organic particles such as styrene microballs, nylon powder, polyethylene powder, acrylic resin powder, urea/formalin resin filler, raw starch particles.

The particle size of the pigment to be in the coating layer for thermal recording media may vary depending on the object and the type of the pigment. In general, it is at most 20 µm. The content of the pigment also varies depending on the type and the particle size of the pigment used. Preferably, the content is from 1 to 60% by weight, more preferably from 3 to 60% by weight of the coating layer.

[Production of Stretched Resin Film with Water-Base Coating Layer (E)]

The stretched resin film having a water-base coating layer (E) of the invention may be produced by combining various methods known by those skilled in the art. Stretched resin films produced by any methods are all within the scope of the invention so far as they satisfy the condition of the invention.

The stretched resin film having a water-base coating layer (E) of the invention can be produced as follows: A thermoplastic resin (A), an inorganic fine powder (B) hydrophilicated with a surface-treating agent (D), an organic filler, and a dispersant (C) are mixed in a predetermined ration, and formed into a film in a mode of extrusion or the like, and then the resulting film is stretched monoaxially or biaxially at a temperature lower than the melting point of the thermoplastic resin (A), preferably lower by from 3 to 60° C. than it. Accordingly, a liquid-absorbing, stretched resin film having fine pores (voids) uniformly in the surface of the film and inside the film is obtained. Then, the above-mentioned pigment coating agent is applied onto at least one surface of the thus-obtained film according to a known in-line and/or out-line process, in such a manner that the amount of the agent applied could be from 0.05 to 100 g/m$^2$ in terms of the solid content thereof. Then, this is dried to obtain a stretched resin film having a water-base coating layer (E) in which the adhesiveness of the coating layer to the stretched resin film is good.

In-line coating as referred to herein means a method of forming a coating layer in a coating zone disposed in the production line for producing stretched resin films, in which the stretched resin film being produced is not once wound up but is directly coated with a coating layer while it is produced. The coating step is incorporated into the production process of producing base films, and the in-line coating process of the type is favorable for industrial mass-production of coated films as the production costs may be reduced.

On the other hand, out-line coating also as referred to herein means a method of forming a coating layer after stretched resin films are once reeled on a roller by the use of a separate apparatus not in the production line of producing the stretched resin films. The out-line coating method broadens the latitude in selecting coating equipment, and the formation of the coating layer may be effected at a speed different from the production speed of the base films. Accordingly, the out-line coating method is favorable for producing a small quantity of products of different types.

When the stretched resin film for use in the invention has a liquid absorption coefficient of smaller than 5 ml/(m$^2$·ms$^{1/2}$), then the water-absorbing speed of the film is low when the film is coated with a water-base coating agent, and, if so, the intended coating efficiency could not be attained. In addition, when the film of the type is used for inkjet recording media, then its ink penetration and drying capability will be poor.

Though not specifically defined, the thickness of the stretched resin film coated with a water-base coating layer (E) is preferably from 40 to 400 µm, more preferably from 60 to 350 µm, even more preferably from 80 to 300 µm. In consideration of the absorbability thereof for the water-base solvent in the water-base coating agent and for water-base ink, the thickness of the water-absorbing outermost layer of the stretched resin film having a multi-layered structure may be from 5 to 100 µm, preferably from 10 to 80 µm. The thickness of the water-base coating layer (E) may vary within a range of from 0.1 to 50 µm, depending on the use and the object of the film, but is preferably from 0.2 to 40 µm.

When a water-base coating agent that is specifically formulated for inkjet recording paper is used in forming the water-base coating layer (E), then the dry amount of the layer may be suitably selected depending on the liquid absorption coefficient of the substrate used. Preferably, it is from 0.1 to 50 g/m², more preferably from 0.2 to 40 g/m². If the dry amount of the coating layer is smaller than 0.1 g/m², then the coated film could not sufficiently exhibit its capability of fixing inkjet ink thereon, and, if so, the printed image may blur. On the other hand, however, if the dry amount of the coating layer is larger than 50 g/m², then the ink fixability on the film may be good but this causes some problems in that the outermost layer of the stretched resin film may lose water absorbability, the surface strength of the coating layer (E) may be low, and such a thick layer could not be formed in single coating but may require repeated multiple coating and the production costs may be thereby increased.

In particular, when the coating layer is for inkjet recording paper, its advantages are that it can sufficiently absorb ink even when its dry amount is smaller than the amount in conventional cases, and can be rapidly dried, since the stretched resin film itself also has good water absorbability like the coating layer (E). Accordingly, even in the recent inkjet printing technology that requires high-speed and high-definition printing, the stretched resin film coated with a water-base coating layer of the invention can be well applied to inkjet recording media not detracting from the rapid driability and the high-definition printability thereof.

The dry amount of the water-base coating agent for the water-base coating layer (E) applied to thermal recording media may be from 0.5 to 20 g/m², preferably from 1 to 15 g/m². If the dry coating amount is smaller than 0.5 g/m², then the film could not exhibit color printability. However, if the dry coating amount is larger than 20 g/m², then the adhesiveness between the coating layer and the stretched resin film may be poor.

For forming the coating layer, for example, herein employable is any ordinary method of blade coating, rod coating, wire bar coating, slide hopper coating, curtain coating, air knife coating, roll coating, size press coating, gravure coating, comma coating, or die coating.

The stretched resin film having a water-base coating layer (E) of the invention may be printed in any ordinary manner (for example, in a mode of oil-base printing, UV offset printing, gravure printing, or flexographic printing). If desired, the film may also be printed in any other printing mode of inkjet recording, thermal recording, thermal transfer recording or electrophotographic recording, in addition to the above-mentioned printing methods.

When the stretched resin film having a water-base coating layer (E) of the invention is printed with images/letters according to various methods mentioned above, then it gives recorded prints.

[Water-Base Heat-Seal Resin Coating Layer (E')]

The water-base heat-seal resin coating layer (E') in the invention is a coating layer, which, for example, in an in-mold process where a label is previously fitted to the mold in pressure forming or injection molding of a thermoplastic resin so that the label could be stuck to the in-mold formed resin container simultaneously with the formation of the container, may directly fuse in the mold owing to the heat of the molten resin in the mold and may therefore uniformly stick to the formed resin container simultaneously with the formation of the container. In this case, a water-base heat-seal resin suitable to such in-mold labels can be selected and used. The invention of this embodiment is also useful for a coating layer that is to be stuck to any other film material by the use of a heat-seal machine. Also in this case, a water-base heat-seal resin can be suitably selected and used, depending on the surface properties of the film to which the layer is to be stuck.

The resin for the water-base heat-seal resin coating layer (E') is preferably in the form of a dispersion of a heat-seal resin suitable to in-mold formation or heat-sealing in view of the in-mold process for it. The heat-seal resin dispersion is, for example, a resin prepared through emulsion polymerization or suspension polymerization or a resin mechanically pulverized through an extruder and dispersed in an aqueous solvent.

The heat-seal resin for use in the water-base heat-seal resin coating layer (E') in the invention is, for example, a dispersion of acrylic polymer, vinyl acetate polymer, styrene polymer, vinyl chloride polymer, vinylidene chloride polymer, polyethylene, polyurethane, polyester, epoxy resin, petroleum resin, rosin ester, silicone resin, alkyd resin, polybutadiene, butadiene copolymer, polybutene, butyl rubber, polypropylene, polychloroprene or polyisoprene.

Of those, preferred are acrylic polymer, vinyl acetate polymer and styrene polymer; and more preferred is a water-base dispersion of ethylene/acrylic acid copolymer, ethylene/methacrylic acid copolymer, ethylene/acrylate copolymer, acrylate polymer, ethylene/vinyl acetate copolymer or styrene/butadiene copolymer.

The dry amount of the heat-seal resin to be applied to the stretched resin film may be suitably determined depending on the liquid absorption coefficient of the film. In general, it is preferably from 0.05 to 30 g/m², more preferably from 0.1 to 20 g/m², even more preferably from 0.2 to 10 g/m².

If the dry coating amount is smaller than 0.05 g/m², then the coated film could not exhibit sufficient adhesion strength to containers or other films when applied to them in an in-mold process or a hot-seal process. On the other hand, if it is larger than 30 g/m², then the adhesion strength of the coated film may be enough but there may occur some problems in using it. For example, air may penetrate into the space between a in-mold label formed of the film and a container and the label may partly blister.

In addition, if the coating amount is too large, then there occur another problem in that such a thick layer could not be formed in single coating but may require repeated multiple coating and the production costs may be thereby increased.

Preferably, the mean particle size of the heat-seal resin dispersion is larger than the mean pore size in the surface of the stretched resin film. Also preferably, the heat-seal resin particles spotwise exist as they are in the surface of the stretched resin film, after applied and dried on the film. Accordingly, drying the coated film must be attained at a temperature not higher than the phase transition temperature of the heat-seal resin. (The phase transition temperature is a temperature at which the resin changes from a solid-phase condition to a liquid-phase condition, and it may be referred to as a film-forming temperature.) The phase transition temperature of the heat-seal resin preferably falls between 50 and 140° C., more preferably between 55 and 130° C. in view of the in-mold process aptitude of the resin. If the coated film is dried at a temperature higher than 140° C., then the coating layer would lose its particle morphology and it may cover the surface of the stretched resin film as a smooth-face layer. As a result, the coated film may produce some problems in that it may blister when processed in an in-mold process, or it may cause blocking when processed for printing or worked into labels. On the other hand, if the phase transition temperature of the heat-seal layer is lower than 50° C., then there may occur some problems in that the layer may be sticky or may cause blocking during storage of labels formed of the coated film.

Preferably, after the stretched resin film is coated with the heat-seal resin and dried, the resin covers at least 30% of the surface of film, more preferably from 40 to 90%, even more preferably from 50 to 80% of the surface of the film for better applicability of the coated film in in-mold processing.

If the coverage is smaller than 30%, then the adhesiveness of the coated film to containers to be produced in an in-mold process may lower.

One example for the water-base heat-seal resin coating layer (E') for in-mold labels is an ethylene/methacrylic acid copolymer dispersion having a mean particle size of 1.2 μm and a phase transition temperature of 90° C.

Preferably, the dispersion for the water-base heat-seal resin coating layer (E') contains a binder resin for improving the adhesiveness thereof to a base film, an antiblocking agent for preventing blocking of labels formed of the coated film, and a lubricant and an antistatic agent for improving film travelability in printing. Further if desired, any of dispersant, thickener, defoaming agent, preservative, UV absorbent, UV stabilizer, antioxidant, surfactant, water-base dye and color pigment may be added to the resin dispersion.

[Production of Stretched Resin Film Coated with Water-Base Heat-Seal Resin Coating Layer (E')]

The stretched resin film coated with a water-base heat-seal resin coating layer (E') of the invention may be produced by combining various methods known by those skilled in the art. Stretched resin films produced by any methods are all within the scope of the invention so far as they satisfy the condition of the invention.

The stretched resin film coated with a water-base heat-seal resin coating layer (E') of the invention can be produced as follows: A thermoplastic resin (A), an inorganic fine powder (B) hydrophilicated with a surface-treating agent (D), anorganic filler, and a dispersant (C) are mixed in a predetermined ration, and formed into a film in a mode of extrusion or the like, and then the resulting film is stretched monoaxially or biaxially at a temperature lower than the melting point of the thermoplastic resin (A), preferably lower by from 3 to 60° C. than it. Accordingly, a liquid-absorbing, stretched resin film having fine pores (voids) uniformly in the surface of the film and inside the film is obtained. Then, a dispersion of ethylene/methacrylic acid copolymer or the like is applied onto the thus-obtained film according to a known in-line and/or out-line process, in such a manner that the amount of the resin dispersion applied could be from 0.05 to 30 g/m² in terms of the solid content thereof and the dispersion particles could exist as they are in the surface of the coated film. Then, this is dried at a temperature not higher than the phase transition temperature of the resin, thereby to obtain a stretched resin film coated with an excellent water-base heat-seal resin coating layer (E').

The stretched resin film of the invention is fabricated by coating a stretched resin film having a liquid absorption coefficient of at least 5 ml/(m²·ms$^{1/2}$), with a water-base heat-seal resin coating layer according to the method as above, and, for example, when compared with in-mold labels fabricated by coating a polypropylene film according to a known out-line coating process or in-line co-extrusion process, the coated film of the invention has various advantages in that it ensures good in-mold process applicability even though the amount of the coating layer is small, and therefore its producibility is good, and it produces inexpensive in-mold labels of high quality and product containers.

If the liquid absorption coefficient of the stretched resin film to be coated is smaller than 5 ml/(m²·ms$^{1/2}$), then its water absorption when coated with a water-base coating agent is not enough and, as a result, the viscosity increase in the coating liquid being applied to the film is low and the coated film could not have a desired coating amount and a desired surface condition of the coating layer.

Preferably, the heat treatment is followed by oxidation such as corona discharge treatment or plasma treatment. The advantages of the oxidation are that, when the water-base heat-seal resin coating layer (E) is formed, the surface wettability of the film is further improved and the solvent absorbability of the heat-seal resin dispersion increases and, as a result, a larger amount of smaller resin particles having a smaller particle size than the pore size in the surface of the stretched resin film may more rapidly penetrate into the film.

Another advantage is that the adhesiveness of the film to the water-base heat-seal resin is improved.

Though not specifically defined, the overall thickness of the stretched resin film coated with a water-base heat-seal resin coating layer (E') is preferably from 40 to 400 μm, more preferably from 50 to 350 μm, even more preferably from 60 to 300 μm. The thickness of the outermost layer of the stretched resin film adjacent to the water-base heat-seal resin coating layer (E) is preferably from 3 to 100 μm, more preferably from 5 to 80 μm, in view of the absorbability of the layer for the water-base solvent in the water-base heat-seal resin dispersion. The thickness of the water-base heat-seal resin coating layer (E) may be suitably determined depending on the use and the object of the film. Preferably, it is from 0.05 to 40 μm, more preferably from 0.1 to 30 μm.

The stretched resin film coated with a water-base heat-seal resin coating layer (E') of the invention may be used for in-mold labels. The labels could be applicable to various resin containers when the type of the water-base heat-seal resin to be used and the phase transition temperature thereof are suitably selected and determined. For example, the labels are applicable to containers of high-density polyethylene, polypropylene, polyester, polystyrene, polyvinyl chloride or polycarbonate, and are especially suitable to high-density polyethylene, polypropylene, polyester or polystyrene containers. In addition, the labels have many other advantages in that they are applicable to containers that are hardly labeled with conventional labels, for example, containers having a specific shape or containers produced in a process of blow molding of reheating a cold parison.

For applying a heat-seal resin to the film, employable is any ordinary coating process of blade coating, rod coating, wire bar coating, slide hopper coating, curtain coating, air knife coating, roll coating, comma coating, size press coating, gravure coating or reverse gravure coating. If desired, these known coating methods may be combined in any desired manner for use herein.

Drying the coated film may be attained in any known manner. However, the coated film must be dried under the condition not exceeding the phase transition temperature of the heat-seal resin.

[Water-Base Adhesive Layer]

Preferably, the water-base adhesive agent to be used in the water-base adhesive layer that constitute the label of the invention contains, for example, at least one selected from starch, glue, casein, cellulose, sodium alginate, guar gum, latex, polymaleic acid-type polymer, polyvinyl alcohol, polyvinylpyrrolidone, carboxymethyl cellulose, methyl cellulose, gelatin, pullulan, acrylic resin, urethane resin and vinyl acetate resin. Of those, preferred are starch and casein. The water-base adhesive for use herein may be an aqueous solution or emulsion that contains the above-mentioned substance.

The dry coating amount of the water-base adhesive may be suitably determined depending on the liquid absorption coefficient of the stretched resin film used. In general, it is preferably from 0.5 to 100 g/m², more preferably from 2 to 50 g/m², even more preferably from 5 to 20 g/m².

If the dry coating amount of the water-base adhesive is at least 0.5 g/m², then it readily produces sufficient adhesion strength to objects such as containers. On the other hand, if the coating amount is at most 100 g/m², then the water-base adhesive may dry within a short period of time and it evades a trouble of label meandering owing to wet adhesive and solves a problem of labeling speed reduction and production cost elevation.

After coated and dried, it is desirable that the adhesive covers at least 10% of the surface of the stretched resin film, more preferably from 30 to 90%, even more preferably from 50 to 80% of the surface of the film, in order that the labels may well stick to objects. If the adhesive-covering area is at least 10%, then the labels ensure good adhesiveness to objects. If it is at most 80%, then suitable air may exist in the non-adhered part between the label and the object, and therefore the drying time for the water-base adhesive could be shortened.

[Production of Delabelable Label]

The delabelable label of the invention can be produced by combining various methods known by those skilled in the art. Delabelable labels produced by any methods are within the scope of the invention so far as they satisfy the condition of the invention.

The stretched resin film for use in the invention may be produced by mixing a thermoplastic resin (A), an inorganic fine powder (B), an organic filler (B') and a dispersant (D) in a predetermined ratio, then extruding the resulting mixture to give a sheet, and thereafter stretching the sheet monoaxially or biaxially at a temperature lower preferably by from 3 to 60° C. than the melting point of the thermoplastic resin (A). Thus produced, the film is a liquid-absorbing, stretched resin film having fine pores (voids) in the surface of the film and inside the film. Then, a water-base adhesive agent is applied onto the thus-obtained film according to a known in-line and/or outline process, in such a manner that the amount of the agent applied could be from 0.5 to 100 g/m² in terms of the solid content thereof.

Preferably, the stretched resin film for use in the invention is stretched in at least one direction, but may be stretched biaxially. The stretched resin film may have a single-layered structure or a multi-layered structure. The multi-layered film may be any of two-layered, three-layered or more multi-layered films.

The single-layered film may be unstretched or monoaxially stretched or biaxially stretched. The two-layered film may have any structure of unstretched/unstretched, unstretched/monoaxially stretched, unstretched/biaxially stretched, monoaxially stretched/monoaxially stretched, monoaxially stretched/biaxially stretched, or biaxially stretched/biaxially stretched. For the three-layered or more multi-layered films, the above-mentioned single-layered structures and two-layered structures may be combined in any desired manner, and the multi-layered films may have any combination of the structures as above.

For example, <1> a film of a crystalline polyolefin-based resin film containing from 0 to 40% by weight, preferably from 3 to 33% by weight of an inorganic finer powder (B) is stretched in one direction at a temperature lower than the melting point of the resin to prepare a monoaxially-oriented substrate layer, <2> a melt of a resin composition that comprises from 20 to 80% by weight of a thermoplastic resin (A), from 80 to 20% by weight of a surface-treated inorganic fine powder and from 0 to 50% by weight of an organic filler (B'), and contains a dispersant (D) in such a ratio that the amount of the dispersant (D) is from 0.01 to 100 parts by weight relative to 100 parts by weight of the total of the thermoplastic resin (A), the inorganic fine powder (B) and the organic filler (B'), is laminated on at least one surface of the substrate layer, and then <3> the resulting laminate film is stretched in the direction perpendicular to the stretching direction as above, to thereby obtain a stretched resin film of a laminate structure in which the surface layer is monoaxially oriented and the substrate layer is biaxially oriented. Further, a water-base adhesive layer is formed on at least one surface of the stretched resin film to give a delabelable label of the invention.

One preferred embodiment of the production method for the label includes a step of forming a water-base adhesive layer on the surface of a film that is fabricated by laminating a substrate layer and an outermost layer and then stretching the resulting laminate all at a time. As compared with the other case where the two layers are separately stretched and laminated, this embodiment is simple and reduces the production costs.

Various known methods may be employable for stretching the film. Preferably, the stretching is attained at a temperature lower by at least 5° C. than the melting point of the resin. When two or more different types of resins are combined and used, then it is desirable that the film stretching is attained at a temperature lower by at least 5° C. than the melting point of the resin that accounts for the largest part of the resin mixture.

Concrete methods of stretching include roll-to-roll stretching to be attained by utilizing the peripheral speed difference between rolls, and a clip stretching to be attained by the use of a tenter oven. Roll-to-roll stretching is favorable, since the draw ratio for stretching may be controlled in any desired manner and since films having any desired stiffness, opacity, smoothness and glossiness can be readily obtained.

If the liquid absorption coefficient of the stretched resin film is smaller than 5 ml/(m²·ms$^{1/2}$), then the water absorbability of the film is insufficient when labeled objects are washed with water, and, if so, delabeling within a desired period of time would be difficult.

The delabelable label of the invention has a water-base adhesive layer as the outer most layer thereof, and on the opposite side of the layer, this is generally printed with patterns and/or letters according to an ordinary pattering and/or printing system. Depending on its use, the label may be laminated with a thermoplastic resin film, laminate paper, pulp paper, nonwoven fabric or cloth. Also if desired, it may be coated with a metal layer of aluminium, silver or the like (metal foil, metal deposition layer). The laminate film structure may be fabricated by separately stretching the constitutive layers followed by laminating them; or by first laminating them followed by stretching the resulting laminate. The surface and the back of the laminate film may also be printed. These methods may be suitably combined in any desired manner.

Though not specifically defined, the overall thickness of the delabelable label of the invention is preferably from 40 to 400 μm, more preferably from 50 to 350 μm, even more preferably from 60 to 300 μm. When the stretched resin film for use herein has a multi-layered structure, then the thickness of the outermost layer of the film adjacent to the water-base adhesive layer is preferably from 3 to 100 μm, more preferably from 5 to 80 μm, in view of the absorbability of the film for the water-base solvent contained in the water-base adhesive. The thickness of the water-base adhesive layer may vary depending on the object and the use of the label. Preferably, it is from 0.1 to 40 μm, more preferably from 0.1 to 30 μm.

[Application to Object]

The delabelable label of the invention is applicable to various objects by suitably selecting and determining the type and the phase transition temperature of the water-base adhesive to be used. For example, it may be applicable to objects formed of metal such as aluminium or stainless steel; glass, ceramics; plastics such as high-density polyethylene, polypropylene, polyester, polystyrene, polyvinyl chloride, polycarbonate; or paper. The label is suitable to objects formed of metal such as aluminium or stainless steel, glass, ceramics, high-density polyethylene, polypropylene, polyester or polystyrene; and more suitable to objects formed of glass or ceramics.

Not specifically defined, the objects may have any shape such as containers, plates, cylinders, balls. Preferred are containers, and more preferred are returnable containers.

The delabelability of the delabelable label of the invention is evaluated as follows: A delabelable label of the invention to be tested is stuck to an object via the water-base adhesive layer thereof to prepare a labeled object, and water is applied to the label of the labeled object under a water pressure of 2 MPa thereto, and the time after which the label is removed from the object is counted. The water-washing time to be taken for label removal from the object is preferably 60 seconds or less, more preferably from 3 to less than 20 seconds. The label that peels off from the object within a period of water-washing time of less than 3 seconds may be problematic in point of the adhesion strength thereof to the object in its practical use; but if the water-washing time is longer than 60 seconds, it is also problematic in that, when the label is used to returnable objects, it may take too long time for removal from the objects. The label of the invention has good delabelability and its practicability is great.

EXAMPLES

The invention is described more concretely with reference to the following Preparation Examples, Production Examples, Working Examples, Comparative Examples and Test Examples. The material, the amount, the blend ratio, the treatment and the process employed in the following Examples may be varied in any desired manner not overstepping the sprit and the scope of the invention. Accordingly, the following Examples are not whatsoever intended to restrict the scope of the invention. The materials used in the following Examples and Comparative Examples shown in Table 1. In the table, MFR means melt flow rate.

Preparation Example 1

Production of Surface-Treating Agent (D)

500 parts by weight of diallylamine hydrochloride (aqueous 60% solution), 13 parts by weight of acrylamide (aqueous 40% solution) and 40 parts by weight of water were put into a reactor equipped with a reflux condenser, a thermometer, a dropping funnel, a stirrer and a gas inlet pipe, and the inner temperature was elevated up to 80° C. with nitrogen gas introduced thereinto. With stirring, 30 parts by weight of ammonium persulfate (aqueous 25% solution) serving as an polymerization initiator was dropwise added to it through the dropping funnel, taking 4 hours. The reaction was continued for 1 hour after the addition, and a viscous pale yellow liquid was obtained. 50 g of this was taken out, and put into 500 ml of acetone, and it produced a white precipitate. The precipitate was taken out through filtration, well washed two times each with 100 ml of acetone, and then dried in vacuum to obtain a white solid polymer (water-soluble cationic copolymer). The weight-average molecular weight of the polymer was obtained through GPC, and was 55,000.

Preparation Example 2

Production of Surface-Treated Calcium Carbonate

40% by weight of heavy calcium carbonate (Nippon Cement's dry-ground product having a mean particle size of 8 μm) and 60% by weight of water were well stirred and mixed to give a slurry, and the surface-treating agent (D) prepared in Preparation Example 1 was added to it in an amount of 0.06 parts by weight relative to 100 parts by weight of heavy calcium carbonate of the slurry. Then, this was wet-ground by the use of a table attritor-type medium stirring mill (with glass beads having a diameter of 1.5 mm—filling factor 170%, peripheral speed 10 m/sec).

Next, 50 parts by weight of a mixture of essentially sodium alkanesulfonate having 14 carbon atoms and sodium alkanesulfonate having 16 carbon atoms (aqueous 2 wt. % solution) was added to it and stirred. Next, this was classified through a 350-mesh screen, and the slurry having passed through the 350-mesh screen was dried by the use of a medium-fluidized drier, Nara Kikai Seisakusho's MSD-200. The mean particle size of the thus-obtained calcium carbonate was determined with Microtrack (by Nikkiso), and was 1.5 μm.

TABLE 1

| Material | Designation of Material | Details |
|---|---|---|
| 1 | thermoplastic resin (A) | propylene homopolymer (Nippon Polychem's trade name, Novatec PP[FY4], having MFR of 4 g/10 min (230° C., 2.16 kg load) and m.p. of 164° C. (as DSC peak temperature) |
| 2 | inorganic fine powder | dry-ground calcium carbonate having a mean particle size of 1.2 μm (Shiroishi Calcium's trade name, Softon 1800) |
| 3 | surface-treated inorganic fine powder | surface-treated calcium carbonate, obtained through wet grinding and surface treatment as in Preparation Example |
| 4 | dispersant | maleic acid-modified polypropylene having a softening point of 154° C. (Sanyo Chemical Industry's trade name, Yumex 1001 (maleic acid modification, 5%)) |
| 5 | dispersant | maleic acid-modified polypropylene having a softening point of 145° C. (Sanyo Chemical Industry's trade name, Yumex 1010 (maleic acid modification, 10%)) |
| 6 | dispersant | silanol-modified polypropylene having MFR of 11 g/10 min (190° C., 2.16 kg load) (Mitsubishi Chemical's trade name, Linklon PP [XPM800H]) |

Production Examples 1 to 22

Stretched resin films were produced according to the process mentioned below (Production Examples 1 to 22). The material and its amount (% by weight) used in producing the stretched resin films, the stretching condition, the thickness of each layer, and the opacity are shown in Table 2. The number of the material in Table 2 corresponds to that in Table 1. The amount of the dispersant shown in Table 2 is in terms of parts by weight relative to 100 parts by weight of the total of the materials 1 to 3.

In Production Examples 1 to 9, and 12 to 15, the blend [A] shown in Table 2 was melt-kneaded in an extruder set at 250° C., and extruded and shaped, and then cooled to 70° C. with a cooling device to obtain a single-layered unstretched sheet. The unstretched sheet was heated at the stretching temperature (1) shown in Table 2, and then stretched 5-fold in the machine direction (MD) between rolls to obtain an MD mono-stretched film. Next, the blend [B] shown in Table 2 was melt-kneaded in an extruder set at 250° C., and laminated onto both faces of the MD mono-stretched film. The resulting laminate was heated at the stretching temperature (2) shown in Table 2, and stretched 8-fold in the cross direction (CD) by the use of a tenter stretcher, and then subjected to heat treatment at a temperature higher by 20° C. than the stretching temperature (2) to obtain a monoaxially-stretched/biaxially-stretched/monoaxially-stretched, three-layered resin film.

In Production Example 10, the blend [B] shown in Table 2 was melt-kneaded in an extruder set at 250° C., and extruded and shaped, and then cooled to 70° C. with a cooling device to obtain a single-layered unstretched sheet. The unstretched sheet was heated at the stretching temperature (1) shown in Table 2, then stretched 5-fold in the machine direction between rolls, and subjected to heat treatment at a temperature higher by 20° C. than the stretching temperature (1) to obtain an MD mono-stretched resin film.

In Production Example 11, the blend [B] shown in Table 2 was melt-kneaded in an extruder set at 250° C., and extruded and shaped, and then cooled to 70° C. with a cooling device to obtain a single-layered unstretched sheet. The unstretched sheet was heated at the stretching temperature (1) shown in Table 2, then stretched 5-fold in the machine direction between rolls, then further heated at the stretching temperature (2) and stretched 8-fold in the cross direction by the use of a tenter stretcher, and thereafter subjected to heat treatment at a temperature higher by 20° C. than the stretching temperature (2) to obtain a successively biaxially-stretched resin film.

In Production Example 16, the blend [B] shown in Table 2 was melt-kneaded in an extruder set at 250° C., and extruded and shaped, and then cooled to 70° C. with a cooling device to obtain a single-layered unstretched sheet. The unstretched sheet was heated at the stretching temperature (1) shown in Table 2, then stretched 5-fold in the machine direction between rolls. However, the film was broken and could not be a stretched film.

In Production Example 17, used was a monoaxially-stretched/biaxially-stretched/monoaxially-stretched, three-layered resin film of Example 3 in JP-A-2001-181423.

In Production Example 18, used was a monoaxially-stretched/biaxially-stretched/monoaxially-stretched, three-layered resin film of Example 3 in JP-A-2001-226507.

In Production Example 19, used was a monoaxially-stretched/biaxially-stretched/monoaxially-stretched, three-layered resin film of Example 3 in JP-A-2001-164017.

In Production Example 20, used was a monoaxially-stretched/biaxially-stretched/monoaxially-stretched, three-layered resin film of Example 4 in JP-A-2001-151918.

In Production Example 21, used was a monoaxially-stretched/biaxially-stretched/monoaxially-stretched, three-layered resin film of Example 2 in JP-A-10-212367.

In Production Example 22, used was a monoaxially-stretched/monoaxially-stretched/monoaxially-stretched, three-layered resin film of Example 3 in JP-A-2002-96422.

Both surfaces of the thus-obtained, single-layered or three-layered stretched resin films were subjected to corona treatment at 40 W/m²·min, by the use of a discharger (by Kasuga Electric) and obtained the stretched resin films.

TABLE 2

| | Blend [A] | | | Blend [B] | | | Stretching | | | | | | | |
|---|---|---|---|---|---|---|---|---|---|---|---|---|---|---|
| | material | amount added (wt. %) | amount of dispersant added (wt.pts.) | material | amount added (wt. %) | amount of dispersant added (wt.pts) | stretching temperature (1) (° C.) | stretching temperature (2) (° C.) | layer constitution | number of axes | thickness (μm) | draw ratio | areal draw ratio of layer [B] | opacity (%) |
| Production Example 1 | 1<br>2 | 80<br>20 | | 1<br>3<br>4 | 40<br>60 | 2 | 140 | 155 | 3 | [B]monoaxial<br>[A]biaxial<br>[B]monoaxial | 25<br>50<br>25 | 5/8 | 8 | 97 |
| Production Example 2 | 1<br>2 | 80<br>20 | | 1<br>3<br>4 | 40<br>60 | 0.5 | 140 | 155 | 3 | [B]monoaxial<br>[A]biaxial<br>[B]monoaxial | 25<br>50<br>25 | 5/8 | 8 | 96 |
| Production Example 3 | 1<br>2 | 80<br>20 | | 1<br>3<br>4 | 40<br>60 | 20 | 140 | 155 | 3 | [B]monoaxial<br>[A]biaxial<br>[B]monoaxial | 25<br>50<br>25 | 5/8 | 8 | 87 |
| Production Example 4 | 1<br>2 | 80<br>20 | | 1<br>3<br>4 | 40<br>60 | 40 | 140 | 155 | 3 | [B]monoaxial<br>[A]biaxial<br>[B]monoaxial | 25<br>50<br>25 | 5/8 | 8 | 80 |
| Production Example 5 | 1<br>2 | 80<br>20 | | 1<br>3<br>5 | 40<br>60 | 2 | 140 | 155 | 3 | [B]monoaxial<br>[A]biaxial<br>[B]monoaxial | 25<br>50<br>25 | 5/8 | 8 | 98 |
| Production Example 6 | 1<br>2 | 80<br>20 | | 1<br>3<br>6 | 40<br>60 | 2 | 140 | 155 | 3 | [B]monoaxial<br>[A]biaxial<br>[B]monoaxial | 25<br>50<br>25 | 5/8 | 8 | 96 |
| Production Example 7 | 1<br>2 | 80<br>20 | | 1<br>3<br>4 | 30<br>70 | 2 | 140 | 155 | 3 | [B]monoaxial<br>[A]biaxial<br>[B]monoaxial | 25<br>50<br>25 | 5/8 | 8 | 98 |
| Production Example 8 | 1<br>2 | 80<br>20 | | 1<br>3<br>4 | 60<br>40 | 2 | 140 | 155 | 3 | [B]monoaxial<br>[A]biaxial<br>[B]monoaxial | 25<br>50<br>25 | 5/8 | 8 | 83 |

TABLE 2-continued

| | Blend [A] | | | Blend [B] | | | Stretching | | | | | | | |
|---|---|---|---|---|---|---|---|---|---|---|---|---|---|---|
| | material | amount added (wt. %) | amount of dispersant added (wt.pts.) | material | amount added (wt. %) | amount of dispersant added (wt.pts) | stretching temperature (1) (° C.) | stretching temperature (2) (° C.) | layer constitution | number of axes | thickness (μm) | draw ratio | areal draw ratio of layer [B] | opacity (%) |
| Production Example 9 | 1 2 | 80 20 | | 1 3 4 | 75 25 | 2 | 140 | 155 | 3 | [B]monoaxial [A]biaxial [B]monoaxial | 25 50 25 | 5/8 | 8 | 80 |
| Production Example 10 | | | | 1 3 4 | 40 60 | 2 | 140 | | 1 | [B]monoaxial | 25 | 5 | 5 | 80 |
| Production Example 11 | | | | 1 3 4 | 40 60 | 2 | 140 | 155 | 1 | [B]biaxial | 28 | 5/8 | 40 | 82 |
| Production Example 12 | 1 | 100 | | 1 3 4 | 40 60 | 2 | 140 | 155 | 3 | [B]monoaxial [A]biaxial [B]monoaxial | 25 50 25 | 5/8 | 8 | 67 |
| Production Example 13 | 1 | 100 | | 1 3 4 | 75 25 | 2 | 140 | 155 | 3 | [B]monoaxial [A]biaxial [B]monoaxial | 25 50 25 | 5/8 | 8 | 31 |
| Production Example 14 | 1 2 | 80 20 | | 1 3 4 | 95 5 | 2 | 140 | 155 | 3 | [B]monoaxial [A]biaxial [B]monoaxial | 25 50 25 | 5/8 | 8 | 65 |
| Production Example 15 | 1 2 | 80 20 | | 1 2 4 | 40 60 | 2 | 140 | 155 | 3 | [B]monoaxial [A]biaxial [B]monoaxial | 25 50 25 | 5/8 | 8 | 96 |
| Production Example 16 | | | | 1 3 4 | 40 60 | 110 | 140 | | 1 | [B]monoaxial | — | — | — | — |
| Production Example 17 | | Example 3 in JP-A 2001-181423 | | | | | 145 | 154 | 3 | [B]monoaxial [A]biaxial [B]monoaxial | 49 43 40 | 4.5/ 8.5 | 8.5 | 95 |
| Production Example 18 | | Example 3 in JP-A 2001-226507 | | | | | 145 | 154 | 3 | [B]monoaxial [A]biaxial [B]monoaxial | 58 50 30 | 4.5/ 8.5 | 8.5 | 96 |
| Production Example 19 | | Example 3 in JP-A 2001-164017 | | | | | 145 | 154 | 3 | [B]monoaxial [A]biaxial [B]monoaxial | 73 59 43 | 4.5/ 8.5 | 8.5 | 98 |
| Production Example 20 | | Example 4 in JP-A 2001-151918 | | | | | 140 | 154 | 3 | [B]monoaxial [A]biaxial [B]monoaxial | 72 38 30 | 4.5/8 | 8 | 95 |
| Production Example 21 | | Example 2 in JP-A 10-212367 | | | | | 135 | 155 | 3 | [B]monoaxial [A]biaxial [B]monoaxial | 20 60 20 | 5/8 | 8 | 94 |
| Production Example 22 | | Example 3 in JP-A 2002-96422 | | | | | 105 | | 3 | [B]monoaxial [A]monoaxial [B]monoaxial | 15 58 43 | 6 | 6 | 85 |

Test Example 1

The surface of the thus-produced stretched resin films was evaluated in point of the inorganic fine powder dispersibility, the surface porosity, the liquid absorption coefficient, the initial adhesion power, the water-base ink driability, and the water-base stamp driability thereof. The details of the tests are mentioned below.

1) Dispersibility of Inorganic Fine Powder:

The blend [B] used in Production Examples 1 to 15, and the surface layer blend in Production Examples 17 to 22 each are melt-kneaded in a melt kneader set at 250° C., and pelletized. 50 g of the resulting pellets are melted by the use of a press-shaping machine set at 230° C., then pressed under 50 kgf/cm$^2$, cooled to 30° C., and cut into a sheet having a length of 120 mm, a width of 120 mm and a thickness of 0.5 mm. Using a small-size biaxial stretcher (by Iwamoto Seisakusho), the sheet is heated at 155° C. and stretched 5-fold biaxially, and then cooled to 90° C. with cold air applied thereto to obtain a biaxially-stretched resin film. The film is exposed to transmissive light, and the number of the inorganic fine powder aggregates of 0.1 mm or more seen therein is counted, and the number thereof per the unit area is determined. The powder dispersibility is evaluated according to the following three ranks.

O: less than 3/m$^2$,
Δ: from 3/m$^2$ to less than 10/m$^2$,
x: 10/m$^2$ or more.

2) Surface Porosity:

The stretched resin films of Production Examples 1 to 15, and Production Examples 17 to 22 each are sampled from any area thereof. The sample is stuck to a sample stand, and its surface to be observed is covered with gold deposition. This is observed with a scanning microscope (Hitachi's S-2400) at 2000-power, and its photographic picture is taken. The pores seen in the picture are stained and traced onto a tracing paper. Using an image analyzer (Nireco's Luzex IID), this is analyzed to determine the surface porosity of the stretched resin film.

3) Liquid Absorption Coefficient:

The stretched resin films of Production Examples 1 to 15 and Production Examples 17 to 22 are analyzed by the use of a liquid dynamic absorption tester (Kumagaya Riki Kogyo's Bristow Tester Model II) according to the Bristow method (Japan TAPPI No. 51-87) to determine the liquid absorption coefficient thereof. The test method is as follows: A test solution is dropwise applied to the sample. Within a period of time from 20 milliseconds to 40 milliseconds after the application of the test solution thereto, a water absorption curve of the sample is drawn. This is converted into a straight line according to a least-squares method, and the liquid absorption coefficient of the sample is obtained from the inclination of the line. The test solution is prepared by mixing 98% by weight of distilled water and 2% by weight of a colorant dye, stamp ink (red) (by Shachihata). The liquid absorption coefficient is evaluated according to the following four ranks. Δ is problematic in practical use; and x is impracticable.

OO: 15 ml/(m$^2 \cdot$ms$^{1/2}$) or more,
O: from 5 ml/(m$^2 \cdot$ms$^{1/2}$) to less than 15 ml/(m$^2 \cdot$ms$^{1/2}$),
Δ: from 1 ml/(m$^2 \cdot$ms$^{1/2}$) to less than 5 ml/(m$^2 \cdot$ms$^{1/2}$),
x: less than 1 ml/(m$^2 \cdot$ms$^{1/2}$)

4) Initial Adhesion Power:

Two test pieces having a width of 40 mm are sampled out from each of stretched resin films of Production Examples 1 to 15 and Production Examples 17 to 21. Using an adhesion power tester (JT Toshi's ASM-01), a water-base adhesive for automatic labelers (Tokiwa Chemical Industry's Tokiwanol 650WR) is applied onto one test piece, then this is left as such for 1 second, and the other test piece is laid on it and stuck thereto under pressure for 1 second. Then, this is left as such for 1 second, and then subjected to a tensile test (at a pulling speed of 300 mm/min). The shearing force is determined in the tensile test, and the maximum load is recorded as the maximum adhesion power of each sample. The initial adhesion power is evaluated according to the following three ranks.

O: 150 g or more,
Δ: from 100 g to less than 150 g,
x: less than 100 g.

5) Water-Base Ink Driability:

A color chart for evaluation (2 cm×2 cm single color 50% printing, 2 cm×2 cm multiple color 200% printing) is prepared for the stretched resin films of Production Examples 1 to 15 and Production Examples 17 to 21. With color inks (yellow, magenta, cyan, black), the films are printed by the use of an inkjet printer (Canon's trade name, BJC-410C). After printed, filter paper is pressed to the printed area of each sample at regular intervals, and the time at which no ink transfer onto the filter paper is seen is read. Depending on the time at which no ink transfer onto the filter paper is seen, the water-base ink driability of the samples is evaluated according to the following three ranks.

O: Immediately after the printing, no ink transfer occurs.
Δ: 10 seconds after the printing, no ink transfer occurs
x: 30 seconds after the printing, no ink transfer occurs.

6) Water-Base Stamp Driability:

Using a stamper (Shachihata's trade name, Stamper XH2471) and supply ink (Shachihata's trade name, XR-2), the stretched resin films of Production Examples 1 to 15 and Production Examples 17 to 21 are stamped. After left for 10 seconds, the stamped surface of each sample is wiped with filter paper, and it sharpness is evaluated according to the following three ranks.

O: The stamped letters are clear, not blurred.
Δ: Though blurred, the stamped letters are legible.
x: As blurred, the stamped letters are illegible.

The test results (Examples 1 to 13, Comparative Examples 1 to 8) are shown in Table 3.

TABLE 3

| | Production Example | Dispersed Condition | Surface Porosity (%) | Liquid Absorption Coefficient ml/(m$^2 \cdot$ms$^{1/2}$) | | Initial Adhesion Power (g/20 mm) | | Water-Base Ink Driability | Stamp Driability |
|---|---|---|---|---|---|---|---|---|---|
| Example 1 | 1 | o | 12 | oo | 20 | o | 200 | o | o |
| Example 2 | 2 | o | 9 | o | 11 | o | 165 | o | o |
| Example 3 | 3 | o | 14 | oo | 24 | o | 230 | o | o |
| Example 4 | 4 | o | 14.5 | oo | 27 | o | 235 | o | o |
| Example 5 | 5 | o | 13.5 | oo | 24 | o | 210 | o | o |
| Example 6 | 6 | o | 11 | oo | 18 | o | 158 | o | o |
| Example 7 | 7 | o | 15 | oo | 26 | o | 240 | o | o |
| Example 8 | 8 | o | 9.5 | o | 10 | o | 165 | o | o |
| Example 9 | 9 | o | 8 | o | 8.5 | o | 155 | o | o |
| Example 10 | 10 | o | 11 | oo | 19 | o | 188 | o | o |
| Example 11 | 11 | o | 38 | oo | 33 | o | 232 | o | o |
| Example 12 | 12 | o | 12 | oo | 22 | o | 200 | o | o |
| Example 13 | 13 | o | 8 | o | 8.5 | o | 155 | o | o |
| Comparative Example 1 | 14 | o | 2 | x | 0.6 | x | 58 | Δ | Δ |
| Comparative Example 2 | 15 | o | 10.5 | x | 0.9 | x | 65 | x | x |
| Comparative Example 3 | 16 | As broken while stretched, no test sample for evaluation was obtained. | | | | | | | |
| Comparative Example 4 | 17 | x | 5.5 | Δ | 4 | Δ | 102 | Δ | Δ |
| Comparative Example 5 | 18 | x | 6 | Δ | 4.5 | Δ | 114 | Δ | Δ |
| Comparative Example 6 | 19 | x | 6 | Δ | 4.5 | Δ | 118 | Δ | Δ |
| Comparative Example 7 | 20 | x | 5.5 | Δ | 4 | Δ | 115 | Δ | Δ |
| Comparative Example 8 | 21 | x | 6 | Δ | 4.5 | Δ | 124 | Δ | Δ |

The results obviously confirm that the stretched resin films of the invention all have a high liquid absorption coefficient, and are all good in point of the initial adhesion power, the water-base ink driability and the water-base stamp driability (Examples 1 to 13). As opposed to these, the stretched resin films not satisfying the condition of the invention are not good and are impracticable (Comparative Examples 1 to 8).

Examples 14 to 22, Comparative Examples 9 to 15

Using a predetermined amount of the material shown in Table 4, inkjet recording paper was produced according to the process mentioned below. Pigment dispersion, binder resin, crosslinking agent, ink fixer and water were mixed to prepare a water-base coating solution for inkjet recording paper, having the composition shown in Table 5. Next, using a bar coater built in a stretched resin film producing line, the coating solution was applied onto the surface of the stretched resin film of any of Production Examples 1, 2, 4 to 6, 8 to 10, 13 to 15, and 17 to 21 at a line speed of 20 m/min, in a mode of in-line coating, and then dried and solidified in an oven having a length of 20 m set at 100° C. to produce inkjet recording paper. The dry coating amount of each constituent component on each paper is shown in Table 5.

Examples 23 to 26, Comparative Examples 16 to 21

The surface of the stretched resin films of Production Examples 1, 5, 6, 13 to 15, 17 and 21 was further processed according to the process mentioned below to produce eight different types of thermal recording paper.

Pigment dispersion 4, leuco dye dispersion, developer dispersion, binder solution 2, and water were mixed and stirred to prepare a water-base coating solution for thermal recording layer, having the composition shown in Table 6.

Using a bar coater, the coating solution was applied onto the surface of the stretched resin film in a mode of out-line coating, at a line speed of 20 m/min so that the dry coating amount thereof could be 5 g/m², and then this was dried and solidified in an oven having a length of 20 m set at 60° C. to produce thermal recording paper.

Test Example 2

1) Inkjet Printer Aptitude

Using a printer, the inkjet recording paper of Examples 14 to 22 and Comparative Examples 9 to 15 is printed under the condition mentioned below, and it is evaluated in point of the compatibility thereof with dye ink and pigment ink.
Printer 1:
Canon BJF-850C (6 colors, dye ink),
superfine mode, with no color correction by driver.
Printer 2:
Epson MC-2000 (6 colors, pigment ink),
MC mat film mode, with no color correction by driver.
Print Sample:
Japan Standard Association SCID Cafe Terrace "A2".
Service Environment:
Windows ME Pentium (registered trade mark) 41.8 GHz, RAM512 MB Parallel I/F.
Software Used:
Adobe Photoshop 5.0J.

(Definition)
After printed, the samples are left in a temperature-controlled room (23° C., relative humidity 65%) for 24 hours, and then the recorded image is observed with an optical microscope (50-power), and evaluated according to the following three ranks.
O: The form of dots is recognizable.
Δ: The form of dots is not recognizable.
x: The image is blurred as a whole.
(Adhesiveness)
After printed, the samples are left in a temperature-controlled room (23° C., relative humidity 65%) for 24 hours, and then the printed surface of each sample is rubbed with a rubber eraser (Tombo's trade name, MONO) five times. The degree of the remaining ink is visually determined.
O: Remaining ink is from 100 to 80%,
Δ: Remaining ink is from 79 to 50%,
x: Remaining ink is from 49 to 0%.
(Water Resistance)
After printed, the samples are left in a temperature-controlled room (23° C., relative humidity 65%) for 24 hours, and then they are dipped in plenty of tap water (25° C.) for 4 hours. After dried, the degree of the remaining ink on each sample is visually determined.
O: Remaining ink is from 100 to 80%,
Δ: Remaining ink is from 79 to 50%,
x: Remaining ink is from 49 to 0%.

2) Thermal Recording Aptitude

The thermal recording paper of Examples 23 to 26 and Comparative Examples 16 to 19 was evaluated for the thermal recording aptitude thereof under the condition mentioned below. The results are given in Table 6.
(Coloration Uniformity)
The thermal recording paper is left in an oven set at 100° C. for 30 minutes so as to form a color image thereon. Then, the coated surface is kept easily observable, and it is visually evaluated in point of the image uniformity thereof.
O: A uniformly colored image is formed.
Δ: The colored image partly has a thinly-colored area.
x: The image has an area not colored at all.
(Coating Film Adhesiveness)
An adhesive tape (Nichiban's trade name, Cellotape registered trade mark) is applied to the coated surface, and it is peeled off by hand, and the condition of the adhesive tape is visually observed.
O: The coating layer sticks very strongly, and the stretched resin film is broken.
Δ: Only the coating layer is partly peeled off.
x: Only the coating layer is peeled off.
The test results are shown in Table 6.
The uniform coloration failure in Comparative Examples 16 and 17 will be because the water absorption of the stretched resin film is low and therefore the film repelled the water-base coating solution. The uniform coloration failure in Comparative Examples 18 and 19 will be because of the dispersion failure in the stretched resin film.

TABLE 4

| Material | Details |
| --- | --- |
| Pigment Dispersion 1 | Inkjet pigment dispersion of silica-combined heavy calcium carbonate, having a solid concentration of 30 wt. % (Fimatec's trade name, FMT-IJ 511). |
| Pigment Dispersion 2 | Silica produced in a gel process and having a mean particle size of 2.5 μm (Mizusawa Chemical's trade name, Mizukasil P-78) is dispersed in water with a Cowless mixer. This dispersion has a solid concentration of 10 wt. %. |

TABLE 4-continued

| Material | Details |
|---|---|
| Pigment Dispersion 3 | Aluminium hydroxide having a mean particle size of 1.0 μm (Showa Denko's trade name, Higilite H-42) is dispersed in water with a Cowless mixer. This dispersion has a solid concentration of 10 wt. %. |
| Pigment Dispersion 4 | Calcium carbonate having a mean particle size of 1.2 μm (Shiroishi Calcium's trade name, Soften 1800) is dispersed in water with a Cowless mixer. This dispersion has a solid concentration of 20 wt. %. |
| Binder Resin Solution 1 | Aqueous 10 wt. % solution of polyvinyl alcohol having a degree of polymerization of 3500 and a degree of saponification of 88% (Kuraray's trade name, PVA-235). |
| Binder Resin Solution 2 | Aqueous 10 wt. % solution of polyvinyl alcohol having a degree of polymerization of 3500 and a degree of saponification of 88% (Kuraray's trade name, PVA-117). |
| Crosslinking Agent | Aqueous solution of melamine-formalin resin having a solid concentration of 80 wt. % (Sumitomo Chemical's trade name, Yuramin P-6300). |
| Ink Fixer | Aqueous solution of cationic acrylic polymer having a solid concentration of 30 wt. % (Sumitomo Chemical's trade name, Sumirez Resin 1001). |
| Leuco Dye Dispersion | 20 wt. % of leuco dye (Yamada Chemical's trade name, S205) and 1 wt. % of methyl cellulose are dispersed in water with a sand mill. This dispersion has a solid concentration of 21 wt. %. |
| Developer Dispersion | 30 wt. % of bisphenol A and 1 wt. % of methyl cellulose are dispersed in water with a sand mill. This dispersion has a solid concentration of 31 wt. %. |

TABLE 5

| | | Example | | | | | | | | | Comparative Example | | | | | | |
|---|---|---|---|---|---|---|---|---|---|---|---|---|---|---|---|---|---|
| | | 14 | 15 | 16 | 17 | 18 | 19 | 20 | 21 | 22 | 9 | 10 | 11 | 12 | 13 | 14 | 15 |
| | Production Example | 1 | 2 | 4 | 5 | 6 | 8 | 9 | 10 | 13 | 14 | 15 | 17 | 18 | 19 | 20 | 21 |
| | Dispersion Condition | ○○ | ○ | ○ | ○ | ○ | ○ | ○ | ○ | ○ | ○ | ○ | x | x | x | x | x |
| | Porosity (%) | 12 | 9 | 14.5 | 13.5 | 11 | 9.5 | 8 | 11 | 8 | 2 | 10.5 | 5.5 | 6 | 6 | 5.5 | 6 |
| | Liquid Absorption Coefficient (ml/(m² · ms$^{1/2}$)) | 20 | 11 | 27 | 24 | 18 | 10 | 8.5 | 19 | 8.5 | 0.6 | 0.9 | 4 | 4.5 | 4.5 | 4 | 4.5 |
| Coating Solution for forming ink-receving layer (wt. pts.) | Pigment Dispersion 1 | 90 | | | 90 | 80 | | 30 | | 90 | 90 | 90 | | | | 80 | 80 |
| | Pigment Dispersion 2 | | 80 | | | | 40 | 30 | 80 | | | | 80 | 80 | | | |
| | Pigment Dispersion 3 | | | 70 | | | 40 | 20 | | | | | | | 70 | | |
| | Binder Resin Solution 1 | 10 | | 30 | | 20 | | | | | | | | | 30 | | |
| | Binder Resin Solution 2 | | 20 | | 10 | | 20 | 20 | 20 | 10 | 10 | 10 | 20 | 20 | | 20 | 20 |
| | Crosslinking Agent | | 2 | 1 | 2 | 2 | 2 | 2 | 2 | 2 | 2 | 2 | 2 | 2 | 2 | 2 | 2 |
| | Ink Fixer | | 2 | 2 | | 2 | 5 | | 2 | | | | 2 | 2 | 2 | 2 | 2 |
| | Dry Coating Amount(g/m²) | 3 | 5 | 10 | 5 | 7 | 5 | 7 | 10 | 10 | 3 | 10 | 5 | 10 | 7 | 7 | 7 |
| Inkjet Printer Aptitude | Dye Ink definition | ○ | ○ | ○ | ○ | ○ | ○ | ○ | ○ | ○ | x | x | Δ | Δ | Δ | Δ | Δ |
| | adhesiveness | ○ | ○ | ○ | ○ | ○ | ○ | ○ | ○ | ○ | Δ | ○ | ○ | ○ | ○ | ○ | ○ |
| | water resistance | ○ | ○ | ○ | ○ | ○ | ○ | ○ | ○ | ○ | x | x | Δ | Δ | Δ | Δ | Δ |
| | Pigment Ink definition | ○ | ○ | ○ | ○ | ○ | ○ | ○ | ○ | ○ | x | x | Δ | Δ | Δ | Δ | Δ |
| | adhesiveness | ○ | ○ | ○ | ○ | ○ | ○ | ○ | ○ | ○ | x | x | ○ | ○ | ○ | ○ | ○ |
| | water resistance | ○ | ○ | ○ | ○ | ○ | ○ | ○ | ○ | ○ | Δ | Δ | ○ | ○ | ○ | ○ | ○ |

TABLE 6

| | | Example | | | | Comparative Example | | | |
|---|---|---|---|---|---|---|---|---|---|
| | | 23 | 24 | 25 | 26 | 16 | 17 | 18 | 19 |
| | Production Example | 1 | 5 | 6 | 13 | 14 | 15 | 17 | 21 |
| | Dispersion Condition | ○ | ○ | ○ | ○ | ○ | ○ | x | x |
| | Porosity (%) | 12 | 13.5 | 11 | 8 | 2 | 10.5 | 5.5 | 6 |
| | Liquid Absorption Coefficient (ml/(m² · ms$^{1/2}$)) | 20 | 24 | 18 | 8.5 | 0.6 | 0.9 | 4 | 4.5 |
| Coating Solution for forming ink-receiving layer (pts.) | Pigment Dispersion 4 | 200 | 200 | 200 | 200 | 200 | 200 | 200 | 200 |
| | Leuco Dye Dispersion | 100 | 100 | 100 | 100 | 100 | 100 | 100 | 100 |
| | Developer Dispersion | 300 | 300 | 300 | 300 | 300 | 300 | 300 | 300 |
| | Binder Resin Solution 2 | 150 | 150 | 150 | 150 | 150 | 150 | 150 | 150 |
| | Water | 80 | 80 | 80 | 80 | 80 | 80 | 80 | 80 |
| | Dry Coating Amount (g/m²) | 5 | 5 | 5 | 5 | 5 | 5 | 5 | 5 |
| Thermal Recording Aptitude | Color Uniformity | ○ | ○ | ○ | ○ | x | x | Δ | Δ |
| | Coating Layer Adhesiveness | ○ | ○ | ○ | ○ | x | Δ | Δ | Δ |

The results obviously confirm that the stretched resin films, which are fabricated by forming a water-base coating layer on a stretched resin film having a high liquid absorption coefficient, exhibit excellent inkjet recording capability and thermal recording capability (Examples 14 to 26). As opposed to these, the stretched resin films not satisfying the condition of the invention are not good and are impracticable (Comparative Examples 9 to 19).

Examples 27 to 35, Comparative Examples 20 to 26

The heat-seal resin dispersion and the antiblocking agent shown in Table 7, and water were mixed to prepare a water-base coating agent having a predetermined solid concentration as in Table 8. Using a slot die coater, the water-base coating agent was applied onto the stretched resin film of Production Examples 1, 2, 4 to 6, 8 to 10, 13 to 15, and 17 to 21, at a line speed of 20 m/min, and then dried in an oven having a length of 10 m, in which the drying temperature was set as in Table 8, to obtain a film for in-mold labels. The dry coating amount of each component of the film thus obtained is shown in Table 8.

Test Example 3

The stretched resin films having a heat-seal resin coating layer formed thereon in Examples 27 to 35 and Comparative Examples 20 to 26 were analyzed and evaluated in point of the surface condition of the coating layer and the in-mold label aptitude (label insertion, blistering resistance, label adhesiveness). The details of the test methods are mentioned below.

1) Surface Condition of Coating Layer:

The heat-seal resin layer-coated, stretched resin films of Examples 27 to 35 and Comparative Examples 20 to 26 are observed with a scanning microscope (Hitachi's S-2400) at 2000-power, on 10 points of the surface of every sample. Thus observed, the samples are confirmed as to whether or not the dispersion applied thereto has left its particle morphology on their surface, and are evaluated according to the following three ranks.

OO: All particles keep their own particle morphology.
O: Some particles fused, but cause no practical problem.
x: No particles are seen, and the coating layer is filmy.

2) Test for In-Mold Label Aptitude:

The heat-seal resin layer-coated, stretched resin films of Examples 27 to 35 and Comparative Examples 20 to 26 are blanked out to give labels having a length of 70 mm and a width of 60 mm. As in FIG. 1, the label is set and fitted to a blow-molding machine in such a manner that the print face (1-a) opposite to the heat-seal resin-coated face (1-b) thereof could be in contact with the inner wall (2-a) of the mold (2) set at 25° C. by degassing the mold through the degassing suction hole (5). Next, high-density polyethylene (Nippon Polychem's trade name, HB-330) heated and melted at 80° C. is blow-molded in the machine at a shot-cycle of 12 seconds to obtain a labeled hollow container.

In the same manner, high-impact polystyrene (Dai-Nippon Ink Chemical Industry's trade name, Dickstyrene IB-100) heated and melted at 210° C. is blow-molded to obtain a labeled hollow container.

Figure 2:
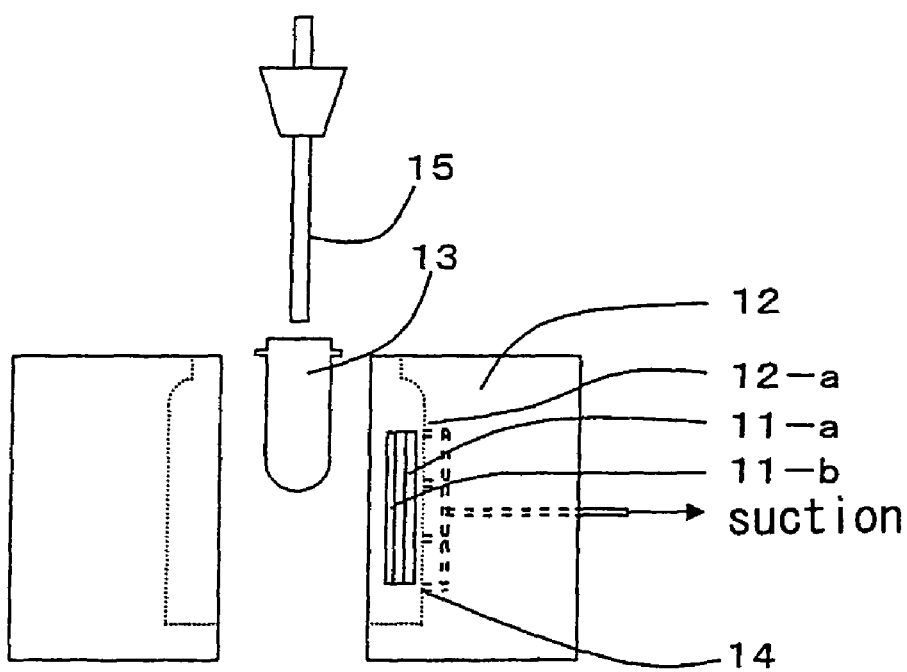
FIG. 2 is a cross-sectional view of a molding machine used in an in-mold label aptitude test for polyethylene terephthalate (PET). In the drawing, 11-a is a label print face; 11-b is a label adhesive face; 12 is a mold; 12-a is an inner wall; 13 is a preform; 14 is a suction hole; 15 is a stretching rod.

Further, as in FIG. 2, the label is set and fitted to an inflation blow-molding machine (Yoki Sangyo's trade name, PET-2W Model) in such a manner that the print face (11-a) opposite to the heat-seal resin-coated face (11-b) thereof could be in contact with the inner wall (12-a) of the mold (12) set at 25° C. by degassing the mold through the degassing suction hole (15). Next, polyethylene terephthalate (Nippon Unipet's trade name, Unipet RT543), which was previously shaped into a preform (small-sized container form) by the use of an injection-molding machine, is heated at 95° C. with an IR heater and inflation-blow-molded in the machine at a shot-cycle of 30 seconds to obtain a labeled hollow container.

The label insertion to the containers being produced, and the labeled hollow containers are evaluated according to the methods mentioned below.

2-1) Label Insertion:

The label insertion condition in 100 shots of blow molding is evaluated according to the criteria mentioned below.

O: All good, as stuck to the designated site with no trouble.
Δ: No label dropped, but some labels shifted from the designated site, and this is problematic in practical use.
x: Some labels dropped and shifted from the designated site during production of containers.

2-2) Blistering:

20 labeled containers are checked for blistering, and evaluated according to the following criteria:

5: No blistering.
4: Blistering occurred in less than 10% of the label area.
3: Blistering occurred in from 10% to less than 20% of the label area.
2: Blistering occurred in from 20% to less than 50% of the label area.
1: Blistering occurred in 50% or more of the label area.

The total point of 20 containers thus tested indicates the blistering resistance thereof (perfect for 100 points).

O: 100 points,
Δ: 80 to 99 points,
x: 79 points or less.

2-3) Label Adhesiveness:

The label part of the labeled container is cut to prepare 4 test pieces each having a width of 15 mm. The label is partly peeled at the edge of each test piece, and its peeling strength (g) is measured by the use of a tensile tester (Orientec's RTM Model) at a pulling speed of 200 mm/min. The data of the samples tested are averaged.

O: 200 g or more,
Δ: from 100 to less than 200 g.
x: less than 100 g.

The test results are given in Table 8.

TABLE 7

| Material | Details |
|---|---|
| Dispersion (1) | Ethylene/methacrylic acid copolymer having a phase transition temperature of 90° C. and a mean particle size of 0.7 μm (Chuo Rika Kogyo's trade name, Aquatex AC-3100). |
| Dispersion (2) | Ethylene/vinyl acetate copolymer having a phase transition temperature of 70° C. and a mean particle size of 1.2 μm (Chuo Rika Kogyo's trade name, Aquatex EC-4800). |
| Dispersion (3) | Ethylene/vinyl acetate copolymer having a phase transition temperature of 80° C. and a mean particle size of 0.8 μm (Chuo Rika Kogyo's trade name, Aquatex MC-3800). |
| Dispersion (4) | Ethylene/vinyl acetate copolymer having a phase transition temperature of 60° C. and a mean particle size of 1.7 μm (Chuo Rika Kogyo's trade name, Aquatex EC-1700). |
| Antiblocking Agent | Ethylene/methyl methacrylate copolymer having a phase transition temperature of 108° C. (Chuo Rika Kogyo's trade name, Rikabond ES-90). |

TABLE 8

| | | Example | | | | | | | | | Comparative Example | | | | | | |
|---|---|---|---|---|---|---|---|---|---|---|---|---|---|---|---|---|---|
| | | 27 | 28 | 29 | 30 | 31 | 32 | 33 | 34 | 35 | 20 | 21 | 22 | 23 | 24 | 25 | 26 |
| Production Example | | 1 | 2 | 4 | 5 | 6 | 8 | 9 | 10 | 13 | 14 | 15 | 17 | 18 | 19 | 20 | 21 |
| Dispersibility | | ○ | ○ | ○ | ○ | ○ | ○ | ○ | ○ | ○ | ○ | ○ | x | x | x | x | x |
| Porosity (%) | | 12 | 9 | 14.5 | 13.5 | 11 | 9.5 | 8 | 11 | 8 | 2 | 10.5 | 5.5 | 6 | 6 | 5.5 | 6 |
| Pore Diameter (μm) | | 0.7 | 0.75 | 0.6 | 0.65 | 0.7 | 0.75 | 1.6 | 0.7 | 0.8 | 0.6 | 1.8 | 2.5 | 2.4 | 2.3 | 3.0 | 1.9 |
| Liquid Absorption Coefficient (ml/(m$^2$·ms$^{1/2}$)) | | ○○ 20 | ○ 11 | ○○ 27 | ○○ 24 | ○○ 18 | ○ 10 | ○ 8.5 | ○○ 19 | ○ 8.5 | x 0.6 | x 0.9 | Δ 4 | Δ 4.5 | Δ 4.5 | Δ 4 | Δ 4.5 |
| Water-Base Coating Agent | Dispersion (1) | | | 50 | 45 | 40 | | | | | 40 | | | | 45 | | |
| | Dispersion (2) | | | | | | 40 | | | 45 | | 45 | | | | | |
| | Dispersion (3) | 40 | 45 | | | | | | 45 | | | | 40 | | | 45 | |
| | Dispersion (4) | | | | | | | 45 | | | | | | 55 | | | 45 |
| | Antiblocking Agent | 5 | 5 | 5 | 5 | 5 | 5 | 5 | 5 | 5 | 5 | 5 | 5 | 5 | 5 | 5 | 5 |
| | Water | 55 | 50 | 45 | 50 | 55 | 55 | 50 | 50 | 50 | 55 | 50 | 55 | 45 | 50 | 50 | 50 |
| Drying Temperature (°C.) | | 70 | 70 | 80 | 80 | 80 | 65 | 55 | 70 | 65 | 80 | 80 | 70 | 55 | 90 | 80 | 70 |
| Dry Coating Amount (g/m$^2$) | | 1 | 1 | 2.5 | 1.5 | 5 | 0.5 | 1 | 1.5 | 1 | 1 | 1 | 1 | 1 | 1 | 1 | 1 |
| Surface Condition of Coating Layer | | ○○ | ○ | ○○ | ○○ | ○○ | ○ | ○ | ○○ | ○ | x | x | ○ | ○ | ○ | ○ | ○ |
| In-mold Label Aptitude | Insertion aptitude | ○ | ○ | ○ | ○ | ○ | ○ | ○ | ○ | ○ | Δ | x | Δ | Δ | Δ | Δ | x |
| | HDPE blistering (points) | ○ 100 | ○ 100 | ○ 100 | ○ 100 | ○ 100 | ○ 100 | ○ 100 | ○ 100 | ○ 100 | x 45 | x 60 | x 75 | x 70 | x 60 | x 75 | Δ 80 |
| | HDPE label adhesiveness (g) | ○ 300 | ○ 350 | ○ 400 | ○ 350 | ○ 300 | ○ 330 | ○ 350 | ○ 400 | ○ 360 | x 60 | x 70 | x 80 | Δ 100 | x 90 | x 85 | x 90 |
| | HIPS blistering (points) | ○ 100 | ○ 100 | ○ 100 | ○ 100 | ○ 100 | ○ 100 | ○ 100 | ○ 100 | ○ 100 | x 50 | x 65 | Δ 80 | Δ 85 | x 65 | x 75 | Δ 80 |
| | HIPS label adhesiveness (g) | ○ 330 | ○ 350 | ○ 440 | ○ 380 | ○ 330 | ○ 335 | ○ 360 | ○ 405 | ○ 370 | x 70 | x 80 | x 90 | Δ 110 | Δ 105 | x 95 | Δ 100 |
| | PET blistering (points) | ○ 100 | ○ 100 | ○ 100 | ○ 100 | ○ 100 | ○ 100 | ○ 100 | ○ 100 | ○ 100 | x 70 | x 70 | Δ 90 | Δ 85 | x 75 | Δ 80 | Δ 90 |
| | PET label adhesiveness (g) | ○ 300 | ○ 400 | ○ 380 | ○ 370 | ○ 350 | ○ 360 | ○ 380 | ○ 380 | ○ 330 | x 70 | x 90 | x 70 | Δ 120 | Δ 110 | x 90 | x 80 |

The results obviously confirm that the stretched resin films, which are fabricated by forming a water-base heat-seal resin coating layer on a stretched resin film having a high liquid absorption coefficient, exhibit excellent in-mold label aptitude (Examples 27 to 35). As opposed to these, the stretched resin films not satisfying the condition of the invention are not good and are impracticable (Comparative Examples 20 to 26).

Examples 36 to 48, Comparative Examples 27 to 32

A casein adhesive (Tokiwa Chemical's Tokiwanol 2100W) was applied on one surface of the stretched resin film (having a size of 100 mm in length and 100 mm in width) produced in Production Examples 1 to 17, 21 and 22 in such a manner that the solid concentration of the coating adhesive could be 5 g/m$^2$, thereby producing labels. The relationship between the number of Production Examples of stretched resin films and that of Examples or Comparative Examples of labels is as in Table 9.

Test Example 4

Three labels of each of Examples 36 to 48 and Comparative Examples 27 to 32 are prepared and evaluated for their delabelability. Thus prepared, three labels are separately stuck to glass bottles (commercial beer bottles of glass having a capacity of 633 ml), and the adhesive is left dried at room temperature for 7 days. Then, the labeled bottles are washed with water under a water pressure of 2 MPa, in such a manner that the label edges could receive water applied thereto (concretely, water is jetted to each bottle in such a manner that it may hit the bonded face between the label and the glass bottle). The time taken from the start of the washing to the removal of the label from the glass bottle is read for three labeled bottles, and the data are averaged. After the label has been removed from the three labeled bottles, the surface of the delabeled bottles is observed in point of the condition of the remaining adhesive or adhesive layer. The delabeled bottles are evaluated according to the following criteria:

Delabeling Time:

○○: From 3 seconds to less than 20 seconds,

○: From 20 seconds to 60 seconds, x: Less than 3 seconds, or more than 60 seconds.

Delabeled Condition:

○: Neither adhesive nor adhesive layer remained on the labeled face of the glass bottle.

x: Some adhesive or adhesive layer remained entirely or partly on the labeled face of the glass bottle.

TABLE 9

| | Production Example | Dispersion Condition | Porosity (%) | Liquid Absorption | | Delabelability | |
|---|---|---|---|---|---|---|---|
| | | | | Coefficient ml/(m²·ms^(1/2)) | | Delabeling Time (sec) | Delabeled Condition |
| Example 36 | 1 | o | 12 | oo | 20 | 18 oo | o |
| Example 37 | 2 | o | 9 | o | 9 | 58 o | o |
| Example 38 | 3 | o | 14 | o | 12 | 49 o | o |
| Example 39 | 4 | o | 14.5 | oo | 27 | 11 oo | o |
| Example 40 | 5 | o | 13.5 | oo | 24 | 14 oo | o |
| Example 41 | 6 | o | 11 | oo | 18 | 16 oo | o |
| Example 42 | 7 | o | 15 | oo | 26 | 9 oo | o |
| Example 43 | 8 | o | 9.5 | o | 10 | 55 o | o |
| Example 44 | 9 | o | 8 | o | 8.5 | 60 o | o |
| Example 45 | 10 | o | 11 | oo | 19 | 21 o | o |
| Example 46 | 11 | o | 38 | oo | 33 | 8 oo | o |
| Example 47 | 12 | o | 12 | oo | 22 | 17 oo | o |
| Example 48 | 13 | o | 8 | o | 8.5 | 59 o | o |
| Comparative Example 27 | 17 | x | 5.5 | Δ | 4 | 88 x | x |
| Comparative Example 28 | 22 | x | 5 | Δ | 3.5 | 90 x | x |
| Comparative Example 29 | 21 | x | 6 | Δ | 4.5 | 71 x | x |
| Comparative Example 30 | 16 | As broken when stretched, test pieces for evaluation could not be obtained. | | | | | |
| Comparative Example 31 | 14 | o | 2 | x | 0.6 | 90< x | x |
| Comparative Example 32 | 15 | o | 10.5 | x | 0.9 | 90< x | x |

The results obviously confirm that the labels of the invention, which are formed of a stretched resin film having a high liquid absorption coefficient, exhibit excellent delabelability (Examples 36 to 48). As opposed to these, the labels formed of a stretched resin film not satisfying the condition of the invention do not have good delabelability and are impracticable (Comparative Examples 27 to 32).

The present disclosure relates to the subject matter contained in PCT/JP03/09435 filed on Jul. 25, 2003, Japanese Patent Application No. 217029/2002 filed on Jul. 25, 2002, Japanese Patent Application No. 259060/2002 filed on Sep. 4, 2002, Japanese Patent Application No. 25575/2003 filed on Feb. 3, 2003 and Japanese Patent Application No. 141577/2003 filed on May 20, 2003, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. A stretched resin film comprising:
   a thermoplastic polyolefin resin (A);
   an inorganic fine powder (B) surface-treated with at least one surface-treating agent (D); and
   a dispersant (C), wherein
   the stretched resin film has a liquid absorption coefficient of at least 5 ml/(m²·ms^(1/2)),
   the surface treated inorganic fine powder comprises a hydrophilicated surface,
   the dispersant (C) is an acid-modified polyolefin,
   the degree of acid modification of the acid-modified polyolefin is from 0.01 to 20%, the surface-treating agent (D) comprises a water-soluble cation copolymer, and
   the water-soluble cation copolymer comprises constitutive units derived from a nonionic hydrophilic vinyl monomer and at least one of a diallylamine salt and an alkyldiallylamine salt;
   further comprising 0.01 to 80 parts by weight of the dispersant (C), relative to 100 parts by weight of a resin composition comprising from 20 to 80% by weight of the thermoplastic resin (A), from 80 to 20% by weight of the inorganic fine powder (B) and from 0 to 50% by weight of an organic filler.

2. The stretched resin film as claimed in claim 1, which has a surface porosity of at least 7%.

3. The stretched resin film as claimed in claim 1, which is stretched in at least one direction and has an areal draw ratio of from 2 to 80 times.

4. The stretched resin film as claimed in claim 1, wherein the dispersant (C) further comprises a silanol-modified polyolefin.

5. The stretched resin film as claimed in claim 1, wherein the thermoplastic polyolefin resin (A) is a crystalline polyolefin resin.

6. The stretched resin film as claimed in claim 1, wherein the surface-treating agent (D) further comprises a water-soluble anionic surfactant.

7. A stretched resin film having a laminate structure constructed by laminating the stretched resin film of claim 1 and any other resin film.

8. A stretched resin film having the stretched resin film of claim 1 as an outermost layer thereof.

9. The stretched resin film as claimed in claim 1, which has an opacity of from 10 to 100%.

10. A laminate structure constructed by laminating the stretched resin film of claim 1 on any other material than the resin film, as an outermost layer thereof.

11. The laminate structure as claimed in claim 10, which has an opacity of from 10 to 100%.

12. A glue label formed of the stretched resin film of claim 1.

13. A stretched resin film constructed by providing a water-base coating layer (E) on at least one surface of the stretched resin film of claim 1.

14. The stretched resin film as claimed in claim 13, wherein the water-base coating layer (E) is a pigment coating layer.

15. The stretched resin film as claimed in claim 13, wherein the water-base coating layer (E) is formed in an in-line process and/or an out-line process.

16. A stretched resin film having a laminate structure constructed by laminating the stretched resin film of claim 13 and any other resin film.

17. A laminate structure constructed by laminating the stretched resin film of claim 13 on any other material than the resin film, as an outermost layer thereof.

18. A recording material that comprises the stretched resin film of claim 13.

19. A stretched resin film constructed by providing a water-base heat-seal resin coating layer (E') on the stretched resin film of claim 1.

20. The stretched resin film as claimed in claim 19, wherein the water-base heat-seal resin coating layer (E') is formed by applying a water-base dispersion-containing coating solution to the film and drying it.

21. The stretched resin film as claimed in claim 20, wherein the dispersion has a mean particle size larger than a mean pore size in the surface of the substrate film.

22. The stretched resin film as claimed in claim 20, wherein the surface of the film is coated with the dispersion having a particle morphology.

23. The stretched resin film as claimed in claim 19, wherein the heat-seal resin in the water-base heat-seal resin coating layer (E') has a phase transition temperature falling between 50 and 140° C.

24. The stretched resin film as claimed in claim 19, wherein the water-base heat-seal resin coating layer (E') is formed in an in-line process and/or an out-line process.

25. The stretched resin film as claimed in claim 19, wherein the surface opposite to the water-base heat-seal resin coating layer (E') is printed with patterns and/or letters for decoration.

26. A stretched resin film having a laminate structure with any other resin film, wherein the stretched resin film of claim 19 forms a layer kept adjacent to the water-base heat-seal resin coating layer (E').

27. An in-mold label formed of the stretched resin film of claim 19.

28. An in-mold container with the label of claim 27 stuck thereto.

29. The in-mold container as claimed in claim 28, wherein the in-mold container is formed of a material selected from a group consisting of high-density polyethylene, polypropylene, polyester, polystyrene, polyvinyl chloride and polycarbonate.

30. A delabelable label constructed by forming a water-base adhesive layer on at least one surface of the stretched resin film of claim 1, which is characterized in that, when it is stuck to an object via the water-base adhesive layer thereof and when the labeled object is washed with water at a water pressure of 2 MPa, then the label removes from the object within 60 seconds from the start of the washing.

31. The delabelable label as claimed in claim 30, wherein the stretched resin film has a multi-layered structure.

32. The delabelable label as claimed in claim 30, wherein the stretched resin film is coated with a metal layer on a side thereof opposite to a water-base adhesive layer-coated surface.

33. The delabelable label as claimed in claim 30, wherein the water-base adhesive contains at least one selected from a group consisting of starch, glue, casein, cellulose, sodium alginate, guar gum, latex, polymaleic acid-type polymer, polyvinyl alcohol, polyvinylpyrrolidone, carboxymethyl cellulose, methyl cellulose, gelatin, pullulane, acrylic resin, urethane resin and vinyl acetate resin.

34. An object with the label of claim 30 stuck thereto.

35. A container with the label of claim 30 stuck thereto.

36. The container as claimed in claim 35, which is formed of a material selected from a group consisting of metals, glass, plastics, ceramics and paper.

* * * * *